(12) United States Patent
Goto et al.

(10) Patent No.: US 11,695,904 B2
(45) Date of Patent: Jul. 4, 2023

(54) REFLECTIVE SCREEN AND IMAGE DISPLAY DEVICE

(71) Applicant: Dai Nippon Printing Co., Ltd., Tokyo (JP)

(72) Inventors: Masahiro Goto, Tokyo (JP); Hiroshi Sekiguchi, Tokyo (JP); Kumiko Kambara, Tokyo (JP); Tomoya Kawashima, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 17/256,350

(22) PCT Filed: Jul. 18, 2019

(86) PCT No.: PCT/JP2019/028274
§ 371 (c)(1),
(2) Date: Dec. 28, 2020

(87) PCT Pub. No.: WO2020/017591
PCT Pub. Date: Jan. 23, 2020

(65) Prior Publication Data
US 2021/0274137 A1    Sep. 2, 2021

(30) Foreign Application Priority Data

Jul. 20, 2018 (JP) .............................. JP2018-136446
Apr. 11, 2019 (JP) .............................. JP2019-075530
Jul. 17, 2019 (JP) .............................. JP2019-131975

(51) Int. Cl.
*H04N 9/31* (2006.01)
*G02F 1/1335* (2006.01)

(52) U.S. Cl.
CPC ..... *H04N 9/3152* (2013.01); *G02F 1/133555* (2013.01); *H04N 9/3185* (2013.01)

(58) Field of Classification Search
CPC ...... H04N 9/3152; H04N 9/3185; H04N 9/31; G03B 21/62; G03B 21/625; G03B 21/56; G02F 1/133555
(Continued)

(56) References Cited

U.S. PATENT DOCUMENTS 8,002,482 B2 *  8/2011  Endo ..................... G03B 21/60
                                                  359/456
2002/0018279 A1   2/2002  Molsen
(Continued)

FOREIGN PATENT DOCUMENTS

CN         1510500 A    7/2004
CN       104298063 B    3/2017
(Continued)

OTHER PUBLICATIONS

International Search Report and Written Opinion (Application No. PCT/JP2019/028274) dated Oct. 1, 2019.
(Continued)

*Primary Examiner* — Sherrie Hsia
(74) *Attorney, Agent, or Firm* — Burr Patent Law, PLLC

(57) ABSTRACT

This reflective screen 10 reflects a part of image light beam projected from an image source LS, to display an image. The reflective screen 10 is provided with: a first optical shape layer 12 which has optical transparency and has a plurality of unit optical shapes 121 arranged on a rear surface thereof; and a reflective layer 13 which is formed in at least some of the unit optical shapes 121 and by which a part of incident light is reflected and at least the other part of the incident light is transmitted, wherein a light diffusing action in the direction in which the unit optical shapes 121 are arranged is larger than a light diffusing action in a direction perpendicular to the arrangement direction.

25 Claims, 26 Drawing Sheets

(58) Field of Classification Search
USPC ........ 348/744, 786, 739; 359/443, 449, 453, 359/456, 460, 893
See application file for complete search history.

(56) References Cited

U.S. PATENT DOCUMENTS

| | | |
|---|---|---|
| 2004/0183968 A1 | 9/2004 | Hosaka |
| 2009/0091718 A1 | 4/2009 | Obi et al. |
| 2014/0036359 A1 | 2/2014 | Jeon et al. |
| 2015/0138627 A1* | 5/2015 | Ehrensperger ......... G03B 21/60 359/460 |
| 2017/0110281 A1 | 4/2017 | Lathrop et al. |
| 2017/0184953 A1 | 6/2017 | Su et al. |
| 2017/0242329 A1 | 8/2017 | Chien et al. |
| 2018/0011322 A1 | 1/2018 | Leighton et al. |
| 2018/0275505 A1 | 9/2018 | Tao et al. |
| 2019/0056650 A1 | 2/2019 | Diao et al. |
| 2020/0236329 A1 | 7/2020 | Takanashi |

FOREIGN PATENT DOCUMENTS

| | | |
|---|---|---|
| CN | 107315255 A | 11/2017 |
| EP | 1 158 336 A2 | 11/2001 |
| JP | H04-1740 A | 1/1992 |
| JP | H09-114003 A1 | 5/1997 |
| JP | 2002-090513 A1 | 3/2002 |
| JP | 2004-198931 A1 | 7/2004 |
| JP | 2005-107011 A1 | 4/2005 |
| JP | 2007-256307 A | 10/2007 |
| JP | 2014-095771 A1 | 5/2014 |
| JP | 2015-524079 A1 | 8/2015 |
| JP | 2015-179201 A | 10/2015 |
| JP | 2016-080787 A1 | 5/2016 |
| JP | 2016-200783 A1 | 12/2016 |
| JP | 2017-090617 A1 | 5/2017 |
| JP | 2017-156452 A1 | 9/2017 |
| JP | 2017-187810 A1 | 10/2017 |
| JP | 2017-211454 A1 | 11/2017 |
| JP | 2018-040892 A | 3/2018 |
| JP | 2018-063404 A | 4/2018 |
| JP | 2018-081193 A | 5/2018 |
| JP | 2018-081262 A | 5/2018 |
| JP | 2018-146666 A | 9/2018 |
| WO | 2007/108387 A1 | 9/2007 |
| WO | 2013/123592 A1 | 8/2013 |
| WO | 2017/094581 A1 | 6/2017 |
| WO | 2017/110281 A1 | 6/2017 |
| WO | 2018/151006 A1 | 8/2018 |

OTHER PUBLICATIONS

Chinese Office Action (Application No. 201980041952.9) dated Aug. 6, 2021 (with English translation).
Chinese Office Action (Application No. 201980041952.9) dated Mar. 1, 2022 (with English translation).
Extended European Search Report (Application No. 19838700.3) dated Mar. 22, 2022.
Japanese Office Action (with English translation) dated Aug. 30, 2022 (Application No. 2018-136446).
Japanese Office Action (with English translation) dated Jan. 10, 2023 (Application No. 2018-136446).
Japanese Office Action (with English Translation), Japanese Application No. 2019-131975, dated May 16, 2023 (14 pages).

* cited by examiner

FIG. 8
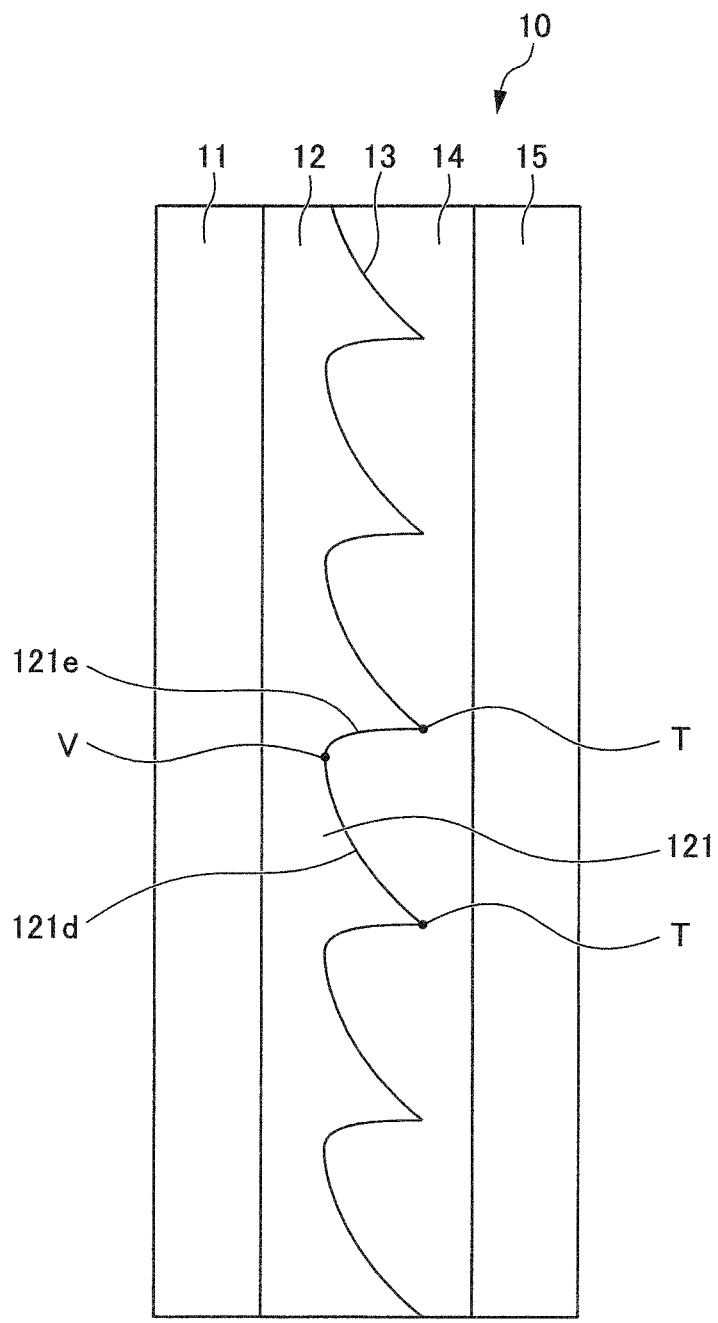
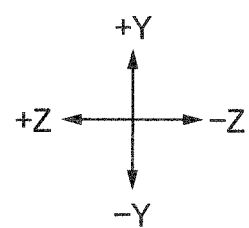

FIG. 10

|  |  |  | TRANSMITTANCE | |
|---|---|---|---|---|
| Example 1 | REFLECTIVE LAYER PORTION(METAL) | | 70% | |
| | LIGHT CONTROL LAYER PORTION (GUEST HOST TYPE) | | ON | OFF |
| | | | 20% | 70% |
| | ENTIRE SCREEN | | 14% | 49% |
| Example 2 | REFLECTIVE LAYER PORTION(DIELECTRIC MULTILAYER FILM) | | 90% | |
| | LIGHT CONTROL LAYER PORTION (NON-GUEST-HOST TYPE) | | ON | OFF |
| | | | 35% | 1% |
| | ENTIRE SCREEN | | 31% | 1% |

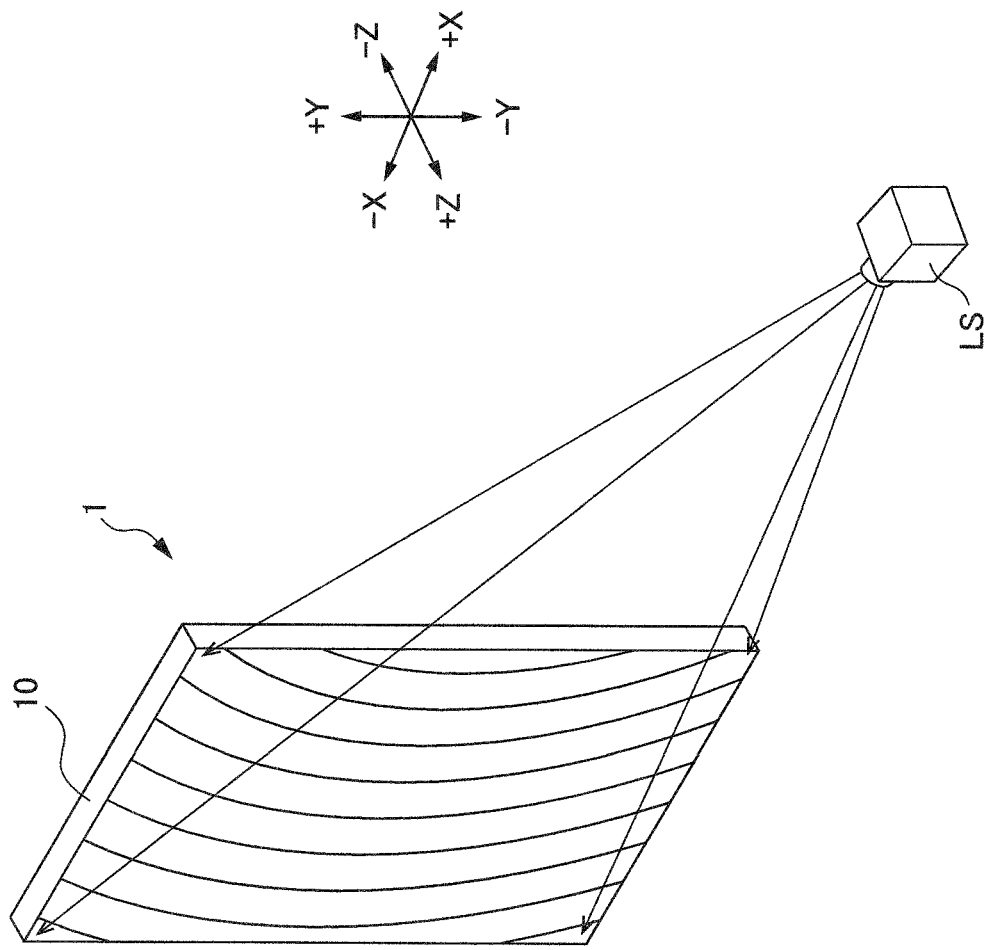
FIG. 23
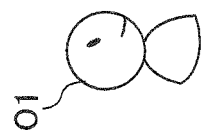

REFLECTIVE SCREEN AND IMAGE DISPLAY DEVICE

FIELD OF THE INVENTION

The present invention relates to a reflective screen and an image display device provided with the reflective screen.

BACKGROUND OF THE INVENTION

In the past, various things have been developed as a reflective screen that reflects and displays image light projected from an image source (for example, refer to Patent Document 1). From these, demand due to high designability, for example, is increasing for a semi-transparent type reflective screen that can be used as a reflective screen that is pasted to a member having high translucency such as window glass and enables an image resulting from projecting image light onto the reflective screen to be satisfactorily recognized visually. When the image light is not being projected and this semi-transparent type reflective screen is not being used, the view from the other side of the screen can be seen through the screen.

Patent Document 1: Japanese Unexamined Patent Application, Publication No. H09-114003

DETAILED DESCRIPTION OF THE INVENTION

Problems to be Solved by the Invention

Such a semi-transparent type reflective screen may be something that forms a Fresnel lens shape in order to deflect (condense) the image light, so that the image light is easier to see at a predetermined position. However, in order to improve an effect of deflecting the image light, it is necessary to strictly set the relative positions of the reflective screen and the image source, and there are cases where it is highly difficult work to install the reflective screen and the image source.

An object of the present invention is to provide a reflective screen and an image display device which has a high degree of freedom for relative positions for the reflective screen and an image source, and can display a good image.

Means for Solving the Problems

The present invention solves the foregoing problem by the following solutions. In order to facilitate understanding, description is made by adding reference symbols that correspond to embodiments of the present invention, but there is no limitation to this.

A first aspect of the present invention is a reflective screen (10) that displays an image by reflecting some of image light projected from an image source (LS), the reflective screen (10) comprising: an optical shape layer (12) that has optical transparency and a plurality of unit optical shapes (121) arranged on a rear surface side; and a reflective layer (13) that is provided on at least part of each unit optical shape (121) to reflect some of incident light and transmit at least some of the remaining incident light.

A second aspect of the present invention is a reflective screen (10) that displays an image by reflecting some of image light projected from an image source (LS), the reflective screen (10) comprising: an optical shape layer (12) that has optical transparency and a plurality of unit optical shapes (121) arranged on a rear surface side; and a reflective layer (13) that is provided on at least part of each unit optical shape (121) to reflect some of incident light and transmit at least some of the remaining incident light, wherein a light diffusing action in a direction in which the unit optical shapes (121) are arranged is greater than a light diffusing action in directions orthogonal to the arrangement direction.

A third aspect of the present invention is the reflective screen according to the first or second aspects, wherein in a case of measuring an angular luminance distribution in a situation where the image light is projected under a condition where the front of the center of a screen has the maximum luminance, the half-value angle in the direction in which the unit optical shapes (121) are arranged is greater than the half-value angle in a direction orthogonal to the arrangement direction by 5% or more.

A fourth aspect of the present invention is the reflective screen according to any one of the first aspect to the third aspect, wherein the optical shape layer has a first surface (121a) onto which the image light is incident; a second surface (121b) that faces the first surface (121a); and a connection surface (121c) configured by a curved surface that connects the first surface (121a) and the second surface (121b).

A fifth aspect of the present invention is the reflective screen (10) according to any one of the first aspect to the third aspect, wherein each unit optical shape (121) has, in a cross-sectional shape cut in the arrangement direction, vertices (T) that protrude the most on the side opposite the image source side, and a valley bottom portion (V) that is depressed the most on the image source side, bordered by the vertices (T) and the valley bottom portion (V), the optical shape layer (12) has a first surface (121a) on a side that has a wider width, and a second surface (121b) on a side that faces the first surface (121a), and at least the first surface (121a) has a curved cross-sectional shape, cut in the arrangement direction.

A sixth aspect of the present invention is the reflective screen (10) according to any one of the first aspect to the fifth aspect, wherein a surface of the reflective layer on at least the image source side is a rough surface and diffusely reflects some of the incident light.

A seventh aspect of the present invention is the reflective screen according to the sixth aspect, wherein the surface of the unit optical shapes (121) has a fine uneven shape. The uneven shape is a shape for which a light diffusion effect in the direction in which the unit optical shapes (121) are arranged is greater than a light diffusion effect in the directions orthogonal to the direction in which the unit optical shapes (121) are arranged, and at least the surface of the reflective layer on the unit optical shapes (121) side has an uneven shape that corresponds to the uneven shape of the unit optical shapes (121).

An eighth aspect of the present invention is the reflective screen (10) according to the fifth aspect, wherein the surface of the unit optical shapes (121) has a fine and irregular uneven shape, and at least the surface of the reflective layer on the unit optical shapes (121) side has an uneven shape that corresponds to the uneven shape of the unit optical shapes (121).

A ninth aspect of the present invention is the reflective screen (10) according to any one of the first aspect to the eighth aspect, wherein in the direction in which the unit optical shapes (121) are arranged, when amounts of angle change from an exit angle where the reflected light from the reflective screen has a peak luminance until exit angles at which the luminance becomes ½ are respectively set to $+\alpha_v 1$ and $-\alpha_v 2$ and the average of the absolute values of $+\alpha_v 1$ and $-\alpha_v 2$ is set to $\alpha_v$, $5° \leq \alpha_v \leq 45°$.

A tenth aspect of the present invention is the reflective screen (10) according to any one of the first aspect to the ninth aspect, wherein in the direction in which the unit optical shapes (121) are arranged, when amounts of angle change from an exit angle where the reflected light from the reflective screen has a peak luminance until exit angles at which the luminance becomes ½ are respectively set to $+\alpha_v 1$ and $-\alpha_v 2$, the average of the absolute values of $+\alpha_v 1$ and $-\alpha_v 2$ is set to $\alpha_v$, and an angle that the first surface forms with a plane parallel to the screen surface is set to $\theta 1$, the relationship $\alpha_v < \arcsin(n \times \sin(2 \times (\theta 1)))$ is satisfied in at least some regions of the reflective screen.

An eleventh aspect of the present invention is the reflective screen (10) according to any one of the first aspect to the tenth aspect, comprising: a light absorption layer (60) provided, in the thickness direction of the reflective screen (10), closer to the rear surface side than the reflective layer (13).

A twelfth aspect of the present invention is the reflective screen (10) according to any one of the first aspect to the eleventh aspect, comprising: a light control layer (20, 40, 210) that enables the transmittance of the light control layer (20, 40, 210) to be changed and is provided, in the thickness direction of the reflective screen (10), closer to the rear surface side than the reflective layer (13).

A thirteenth aspect of the present invention is the reflective screen (10) according to the twelfth aspect, wherein the light control layer (20) has a first electrode (22A) that is transparent; a second electrode (22B) that is transparent and is arranged facing the first electrode (22A); and a light control material (26, 27) that is arranged between the first electrode (22A) and the second electrode (22B) and enables the transmittance of the light control material (26, 27) to be changed in accordance with a difference in potential between the first electrode (22A) and the second electrode (22B).

A fourteenth aspect of the present invention is the reflective screen (10) according to the thirteenth aspect, wherein the light control material (26, 27) is liquid crystals that have a dichroic pigment.

A fifteenth aspect of the present invention is the reflective screen (10) according to the twelfth aspect, wherein the light control layer (40) includes a photosensitive substance.

A sixteenth aspect of the present invention is the reflective screen (10) according to the fifteenth aspect, wherein the transmittance of the photosensitive substance changes by the photosensitive substance receiving ultraviolet rays as excitation light, and a light guiding layer (214) that guide the excitation light to the photosensitive substance is provided.

A seventeenth aspect of the present invention is the reflective screen (10) according to the sixteenth aspect, wherein the light control layer (210) is provided with a blocking layer (212, 213) that blocks at least some of the excitation light and is arranged at positions that sandwich the photosensitive substance and the light guiding layer (214) from both sides.

An eighteenth aspect of the present invention is the reflective screen (10) according to any one of the first aspect to the seventeenth aspect, wherein the reflective layer (13) is formed in a plurality of island shapes at positions on the unit optical shapes (121) where the image light is incident.

A nineteenth aspect of the present invention is the reflective screen (10) according to any one of the first aspect to the eighteenth aspect, wherein the reflective layer (13) includes at least one dielectric film.

A twentieth aspect of the present invention is the reflective screen (10) according to any one of the first aspect to the nineteenth aspect, wherein the optical shape layer (12) has a circular Fresnel lens shape in which the plurality of unit optical shapes (121) are arranged in concentric circles.

A twenty-first aspect of the present invention is the reflective screen (10) according to the twentieth aspect, wherein the center of the circular Fresnel lens shape is provided outside of the reflective screen (10).

A twenty-second aspect of the present invention is the reflective screen (10) according to any one of the first aspect to the twenty-first aspect, comprising: a second optical shape layer (14) that is closer to the rear surface side in the thickness direction of the reflective screen (10) than the reflective layer (13), has optical transparency, and is laminated so as to fill valley portions between the unit optical shapes (121).

A twenty-third aspect of the present invention is the reflective screen (10) according to any one of the first aspect to the twenty-second aspect, wherein a light diffusion layer comprising diffusion particles that have a function to diffuse light is not provided.

A twenty-fourth aspect of the present invention is a reflective screen (100) characterized in being the reflective screen (10) according to any one of the first aspect to the twenty-third aspect, wherein a plurality of the reflective layers (13) are provided, respectively separated by a predetermined interval in the thickness direction of the reflective screen (10).

A twenty-fifth aspect of the present invention is an image display device (1) comprising: the reflective screen (10, 100) according to any one of the first aspect to the twenty-fourth aspect; and an image source (LS) that projects the image light onto the reflective screen (10, 100).

Effects of the Invention

By virtue of the present invention, it is possible to provide a reflective screen and an image display device which has a high degree of freedom of relative positions for the reflective screen and an image source and can display a good image.

BRIEF DESCRIPTION OF THE DRAWINGS

FIG. 6 is a view describing the relationship between ½ angles $\alpha_v$, an incident angle $\varphi$ of image light, and an angle $\theta 1$ of a first slope 121a;

FIG. 8 is a view that illustrates a modification of the first embodiment with a similar cross-section to FIG. 3;

FIG. 10 is a table that summarizes transmittances of an example 1 and an example 2;

FIG. 23 is a perspective view that illustrates the image display device 1 of a seventh embodiment;

PREFERRED MODE FOR CARRYING OUT THE INVENTION

With reference to the drawings and the like, description is given below regarding a preferred mode for carrying out the present invention. Including FIG. 1, each view described below is illustrated schematically. The size and shape of each unit is appropriately exaggerated or simplified in order to facilitate understanding. In the present specification, names of materials, numbers for dimensions, and so on in relation to various members are examples for embodiments. There is no limitation to these numbers, names of materials, and the like, and they may be appropriately selected and used. In the present specification, in regard to terms specifying shapes or geometric conditions, for example terms such as "parallel" or "orthogonal", are construed to include states having error of a level that can be treated as parallel or orthogonal and achieve a similar optical function, in addition to their strict meaning. In the present specification, words such as "plate", "sheet", and "film" are used. However, the typical usage of these words is for plate, sheet, and film to be used in this order in an order of thickest to thinnest, and these words are used in this way in the present specification. However, because there is no technical meaning behind different usage of these words, it is assumed that these words can be exchanged as appropriate. In the present specification, for every "sheet", it is assumed that a "sheet surface" indicates a surface of the sheet in a planar direction of the sheet when the entirety of the sheet is viewed. The same applies for a "plate surface" and a "film surface".

First Embodiment

Figure 1:
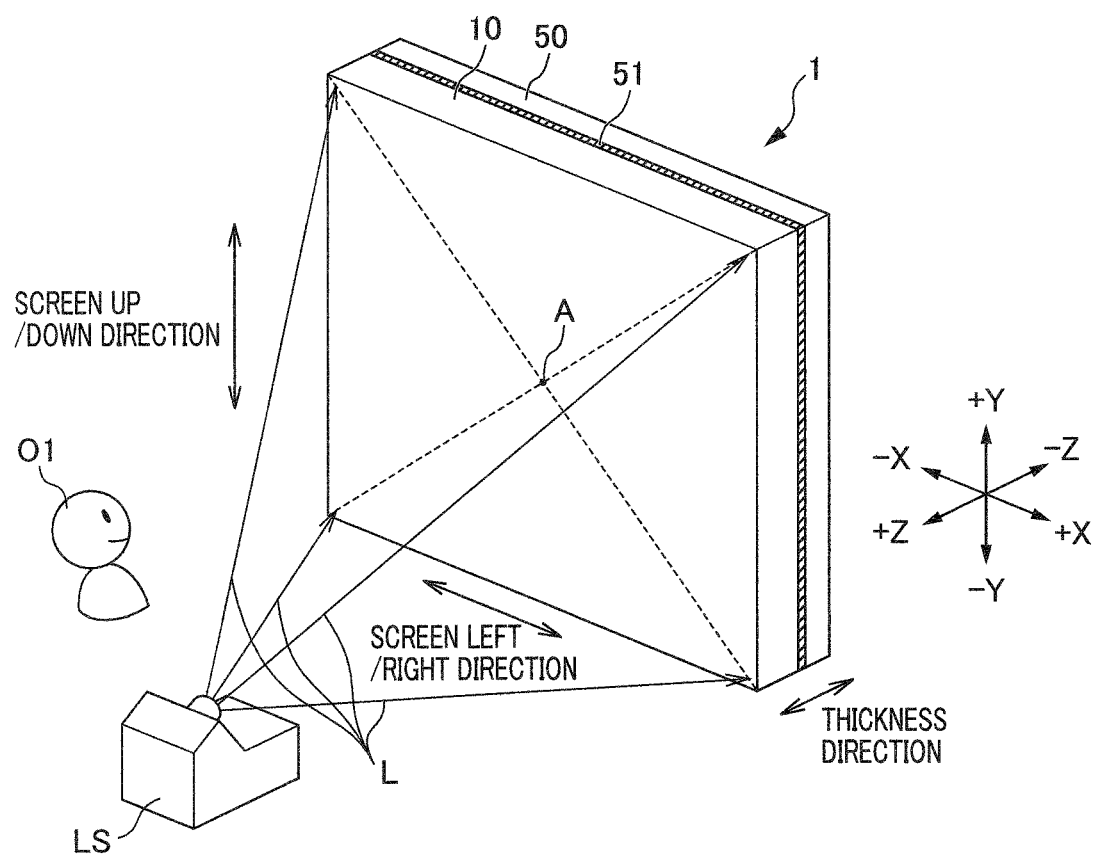
FIG. 1 is a perspective view that illustrates an image display device 1 according to a first embodiment.
Figure 2:
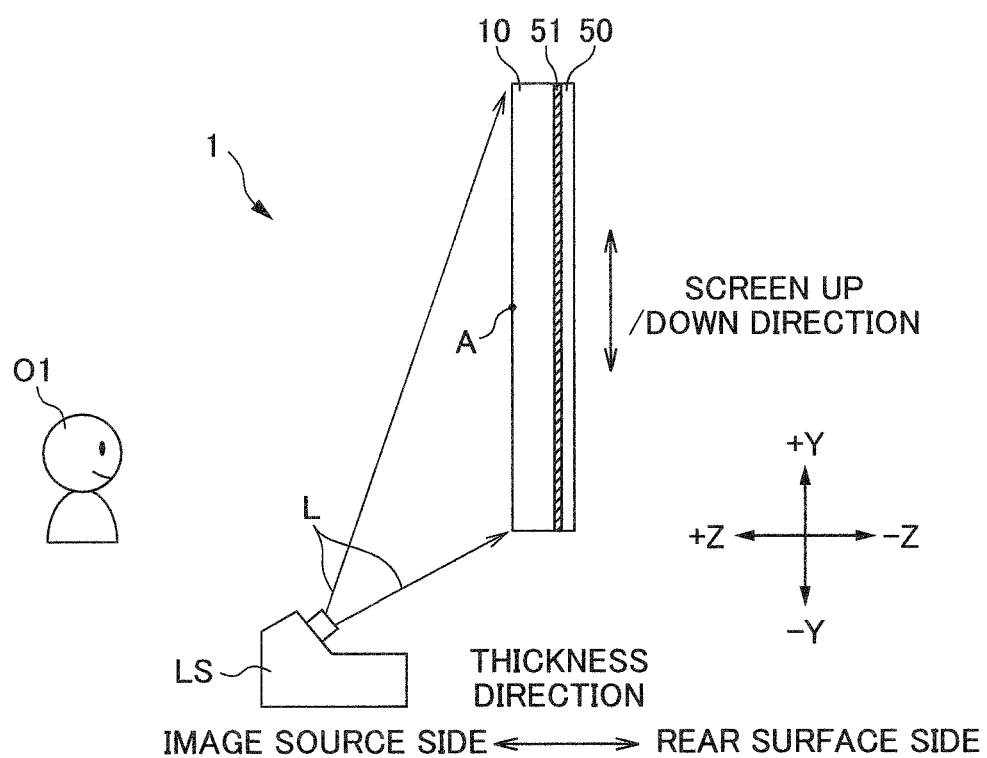
FIG. 2 is a view seen from a side surface of the image display device 1.

FIG. 1 is a perspective view that illustrates an image display device 1 according to a first embodiment. FIG. 2 is a view seen from a side surface of the image display device 1. The image display device 1 comprises a screen 10 and an image source LS. The screen 10 according to the present embodiment is a reflective screen that reflects image light L projected from the image source LS, and displays an image on a screen. Details of the screen 10 are described below. In the present embodiment, description is made by giving an example in which the image display device 1 is applied to a partition configured by a transparent plate for indoor use, and the screen 10 is fixed to the transparent plate. A plate-shaped member that has high transparency and is made from glass, resin, or the like is used as such a transparent plate.

In order to facilitate understanding, in each view described below including FIG. 1 and FIG. 2, an XYZ Cartesian coordinate system is provided, as appropriate. In this coordinate system, it is assumed that the horizontal direction (left/right direction) of the screen 10 is the X direction, the vertical direction (up/down direction) is the Y direction, and the thickness direction of the screen 10 is the Z direction. The screen 10 is parallel to the XY plane, and the thickness direction (Z direction) of the screen 10 is orthogonal to the screen 10. In addition, it is assumed that a direction toward a right side in the horizontal direction seen from an observer O1 who is positioned in a front direction on an image source side of the screen 10 is the +X direction, a direction toward the upper side in the vertical direction is the +Y direction, and a direction from the rear surface side (back surface side) toward the image source side in the thickness direction is the +Z direction. Furthermore, in the following description, unless otherwise specified, a screen up/down direction, a screen left/right direction, and a thickness direction are the up/down direction (vertical direction), left/right direction (horizontal direction), and thickness direction (depth direction) of the screen 10 in the use situation, and are respectively parallel to the Y direction, the X direction, and the Z direction.

The image source LS is an image projection device that projects the image light L onto the screen 10, and is a short focus type projector, for example. When the image display device 1 is being used, the image source LS is positioned at the center in the left/right direction of the screen 10 and lower in the vertical direction than the screen 10 when the screen 10 (display region) is seen from the front direction (normal direction of the screen surface). The image source LS can project the image light L diagonally from a position at which a distance in the depth direction (Z direction) from the surface of the screen 10 is significantly closer than a general-purpose projector which would be positioned in the screen front direction with respect to a conventional screen. Accordingly, in comparison to a conventional general-purpose projector, the image source LS has a shorter projection distance to the screen 10, has a larger incident angle at which the projected image light L is incident on the screen 10, and also has a larger amount of change in the incident angle (the amount of change from the minimum value for the incident angle to the maximum value).

The screen 10 is a semi-transparent type reflective screen that reflects the image light L projected by the image source LS toward the side of an observer O1, who is positioned in a front direction with respect to the image source side (+Z side), to enable the image to be displayed to the observer O1. The screen 10 also has transparency that enables a view on the other side of the screen 10 to be observed. When the screen 10 is being used, the screen 10 (display region) is a roughly rectangular shape for which a long side direction seen from the observer O1 side is the screen left/right direction. The size of the screen 10 is approximately 40 to 100 inches diagonally. The aspect ratio of the screen is 16:9. There is no limitation to this, and, for example, the shape of screen 10 as seen from the observer O1 side may be another shape, the size of the screen 10 may be 40 inches or less, and the size or shape of the screen 10 can be appropriately selected in accordance with a usage purpose, a usage environment, or the like.

In the case where the screen 10 is, for example, a laminate made up of thin layers made of resin, the screen 10 alone will not have sufficient rigidity to maintain planarity. Accordingly, as illustrated in FIG. 1, FIG. 2, and the like, the screen 10 according to the present embodiment is kept flat with the rear surface side of the screen 10 being integrally bonded (or partially fixed) to a support plate 50 intermediated by a bonding layer 51 that has optical transparency. The support plate 50 is a flat plate-shaped member that has optical transparency and high rigidity. It is possible to use a plate-shaped member made of, for example, glass or a resin such as acrylic resin or polycarbonate (PC) resin for the support plate 50. The support plate 50 in the present embodiment is a transparent plate made of glass and is for an indoor partition. Note that there is no limitation to this, and there may be a mode in which the planar nature of the screen 10 is maintained by the four sides or the like of the screen 10 being supported by a frame member (not illustrated) or the like. Naturally, it is possible to use a transparent sheet having high rigidity as a base material.

Figure 3:
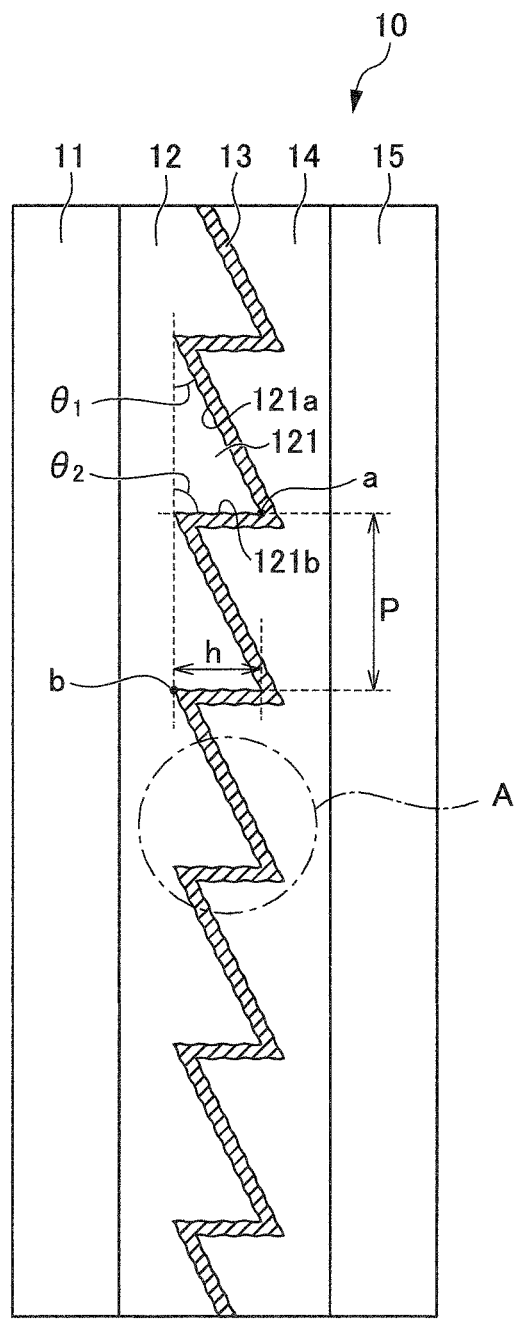
FIG. 3 is a view that illustrates an example of a layer structure of a screen 10 according to the first embodiment.
Figure 4:
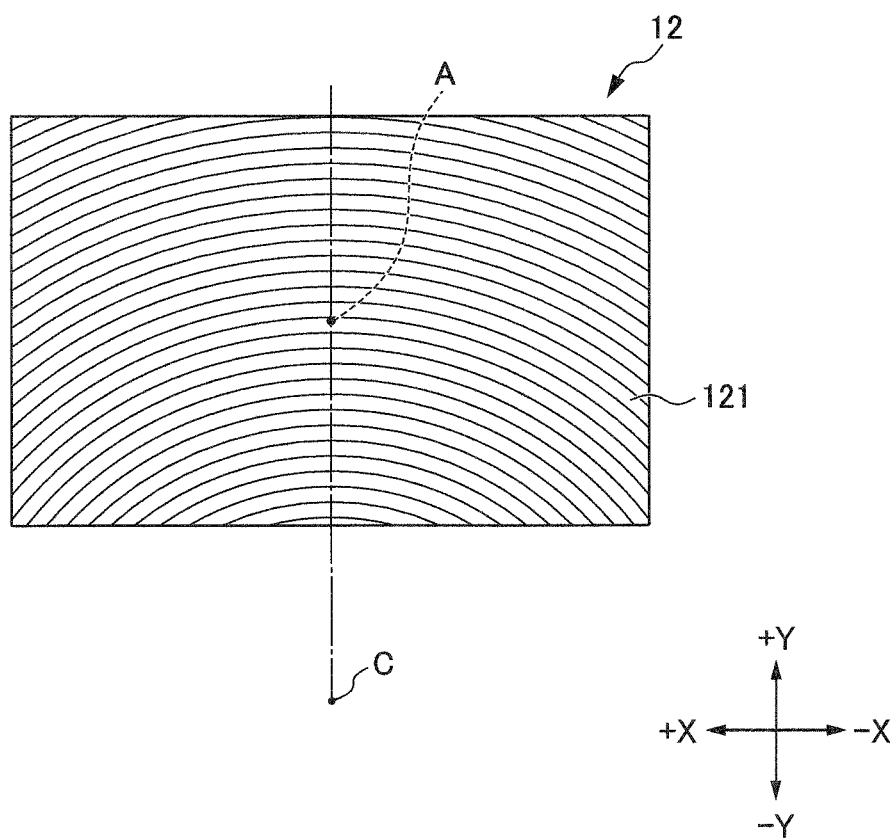
FIG. 4 is a view describing a first optical shape layer 12 of an embodiment.

FIG. 3 is a view that illustrates an example of a layer structure of the screen 10 according to the first embodiment. FIG. 3 illustrates a cross-section that is parallel to the screen up/down direction (Y direction), is orthogonal to the screen surface (is parallel to the Z direction), and passes through a point A that is at the center of the screen 10 (geometric center of the screen) (refer to FIG. 1 and FIG. 2). Note that FIG. 3 illustrates only the screen 10, and omits the support plate 50 and the like. FIG. 4 is a view illustrating a first optical shape layer 12 according to an embodiment. In FIG. 4, the first optical shape layer 12 is viewed from the rear surface side (−Z side), and the reflective layer 13 and the like are omitted in order to facilitate understanding. As illustrated in FIG. 3, the screen 10 is provided with, in a thickness direction (Z direction) in an order from the image source side (+Z side) of the screen 10, a base material layer 11, the first optical shape layer 12, a reflective layer 13, a second optical shape layer 14, and a protective layer 15, for example.

The base material layer 11 is a sheet-shaped member that has optical transparency. The first optical shape layer 12 is integrally formed on the rear surface side (−Z side) of the base material layer 11. The base material layer 11 is a base material (base) for forming the first optical shape layer 12. The base material layer 11 is formed from, for example, a polyester resin such as PET (polyethylene terephthalate), an acrylic resin, a styrene resin, an acrylic styrene resin, a PC (polycarbonate) resin, an alicyclic polyolefin resin, a TAC (triacetyl cellulose) resin, or the like, which have high optical transparency. The thickness of the base material layer 11 may be appropriately set in accordance with, for example, the size of the screen 10.

The first optical shape layer 12 is a layer that has optical transparency and is formed on the rear surface side (−Z side) of the base material layer 11. A plurality of unit optical shapes 121 are provided and arranged on the surface on the rear surface side (−Z side) of the first optical shape layer 12. As illustrated in FIG. 4, the plurality of unit optical shapes 121 are partial shapes (arcs) of a true circle, and are arranged concentrically centered on a point C positioned outside of the screen 10 (display region). In other words, the first optical shape layer 12 has a circular Fresnel lens shape, of which the point C is center (Fresnel center) with a so-called offset structure, on the rear surface side thereof. In the present embodiment, when the first optical shape layer 12 is seen from a normal direction rear surface side of the screen surface, as illustrated in FIG. 4, the point C is positioned at the center in the screen left/right direction and lower than the screen. The point C and the point A are positioned on the same straight line which is parallel to the Y direction.

Figure 5:
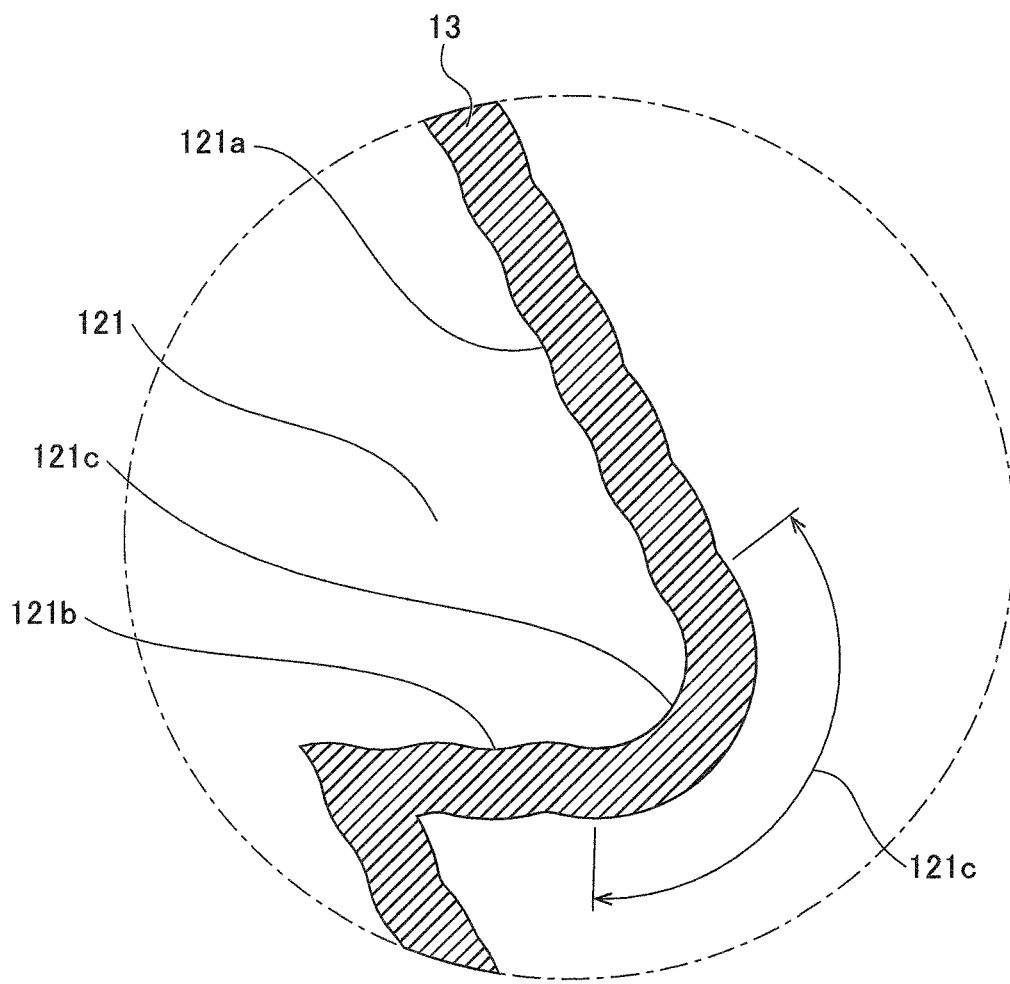
FIG. 5 is a view that enlarges a region A surrounded by a dot-dash circle in FIG. 3.

FIG. 5 is a view that enlarges a region A surrounded by a dot-dash circle in FIG. 3. As illustrated in FIG. 3 and FIG. 5, each unit optical shape 121 has a roughly triangular cross-sectional shape of which the vertices are rounded, in a cross-section parallel to the direction in which the unit optical shapes 121 are arranged, and parallel to a direction (Z direction) orthogonal to the screen surface. Each unit optical shape 121 protrudes on the rear surface side (−Z side), and has a first slope (first surface) 121a onto which the image light is incident, a second slope (second surface) 121b that faces the first slope 121a, and a connection surface 121c made up of a curved surface that connects the first slope 121a and the second slope 121b. In each unit optical shape 121, the first slope 121a is positioned on a side (+Y side) above the second slope 121b, sandwiching the connection surface 121c formed at a portion of a vertex a.

The angle that the first slope 121a forms with a surface parallel to the screen surface is θ1. The angle that the second slope 121b forms with a surface parallel to the screen surface is θ2. The angles θ1 and θ2 satisfy the relationship θ2>θ1. The first slope 121a, the second slope 121b, and the connection surface 121c of each unit optical shape 121 form an uneven shape that is fine and irregular. This fine uneven shape is formed by protruding shapes and recessed shapes irregularly arranged two-dimensionally. The size, shape, height, and the like of the protruding shapes and the recessed shapes are irregular.

In the present embodiment, excluding where the cross-sectional shape illustrated in FIG. 5 has a fine uneven shape (when viewed macroscopically), the connection surface 121c is configured as a roughly cylindrical surface that has a roughly arc shape. By providing the connection surface 121c, portions where the reflective layer 13, which is described below, reflects the image light is not just the first slope 121a, but some of the image light is also reflected by the connection surface 121c. The connection surface 121c is made up of a curved surface that smoothly connects the first slope 121a to the second slope 121b. Accordingly, the reflective layer 13, which is formed on the connection surface 121c, is more capable of expanding an effective light path of the image light in the up/down direction than a light path in a case where only the first slope 121a reflects the image light. Accordingly, a light diffusing action in the direction in which the unit optical shapes 121 are arranged is greater than a light diffusing action in directions orthogonal to the arrangement direction. Note that, although the connection surface 121c is illustrated in FIG. 5 as a precise arc so that it is easy to understand the connection surface 121c, a fine uneven shape is provided on the connection surface 121c, similar to the first slope 121a and the second slope 121b. Although this fine uneven shape and reflective layer are provided on the connection surface 121c, there may be a configuration in which this fine uneven shape and reflective layer are not provided on the connection surface 121c.

An arrangement pitch of the unit optical shapes 121 is P, and a height of a unit optical shape 121 (dimension from the vertex a to a point b which is a valley bottom between unit optical shapes 121, in the thickness direction) is h. In order to facilitate understanding, FIG. 2 illustrates an example in which an arrangement pitch P1 of the unit optical shapes 121 and the angles θ1 and θ2 are constant in the direction in which the unit optical shapes 121 are arranged. However, for the unit optical shapes 121 in the present embodiment, although the arrangement pitch P is constant in practice, the angle θ1 gradually increases as the distance from the point C which is the Fresnel center increases in the direction in which the unit optical shapes 121 are arranged. The angles θ1 and θ2, the arrangement pitch P, and the like may be set, as appropriate in accordance with the projection angle of the image light from the image source LS (incident angle of the image light with respect to the screen 10), the size of a pixel of the image source LS, the size of the screen 10, the refractive index of each layer, or the like. For example, there may be a mode in which the arrangement pitch P, the angle θ1, or the like changes along the direction in which the unit optical shapes 121 are arranged.

In the present embodiment, description is given for an example in which a circular Fresnel lens shape is formed on the rear surface side of the first optical shape layer 12. There is no limitation to this, and there may be a mode in which a linear Fresnel lens shape, in which the unit optical shapes 121 are arranged in the screen up/down direction (Y direction) and the screen left/right direction (X direction) is taken as the longitudinal direction, is formed on the surface on the rear surface side of the first optical shape layer 12. In addition, there may be a mode in which a plurality of columnar unit prisms are arranged in the screen up/down direction (Y direction), where the screen left/right direction (X direction) is taken as the longitudinal direction.

The first optical shape layer 12 is formed from a UV curable resin such as a urethane acrylate, a polyester acrylate, an epoxy acrylate, a polyether acrylate, a polythiol, or a butadiene acrylate, which have high optical transparency. In the present embodiment, a UV curable resin is described as an example of a resin that makes up the first optical shape layer 12, but there is no limitation to this, and the first optical shape layer 12 may be formed from another ionizing radiation curable resin such as an electron beam curable resin.

The reflective layer 13 is formed on the unit optical shapes 121 (on the first slope 121a, the second slope 121b, and the connection surface 121c). The reflective layer 13 is a so-called half mirror: a semi-transparent type reflective layer that reflects some of the incident light and transmits the remaining incident light. As described above, a fine uneven shape is formed on the first slope 121a, the second slope 121b, and the connection surface 121c (the surface of each unit optical shape 121). The reflective layer 13 is formed following this fine uneven shape, and is deposited in a state such that this fine and irregular uneven shape is also maintained on the surface on the side opposite to the side of the unit optical shapes 121. Accordingly, the surface on the image source side (the surface on the first optical shape layer 12 side) of the reflective layer 13 and the surface on the rear surface side (the surface on the second optical shape layer 14 side) are matte surfaces (rough surfaces) that have a fine and irregular uneven shape. The reflective layer 13 has a function of diffusely reflecting some of the incident light in accordance with the fine uneven shape of the reflective surface, and transmitting, without diffusion, the remaining light that is not reflected.

In the present embodiment, three types of the reflective layer 13 are manufactured: a configuration that uses metal, a configuration that uses a dielectric multilayer film, and a configuration that uses a single layer dielectric film. For the reflective layer 13, it is possible to use a metal film and a dielectric film by appropriately combining the metal film and the dielectric film into a single layer or multiple layers. In a case of using metal, the reflective layer 13 is formed from a metal having high light reflectivity, such as aluminum, silver, or nickel, for example. The thickness of the reflective layer is several tens of Angstroms. The reflective layer 13 is not limited to this, and may be formed by sputtering a metal having high light reflectivity as described above, for example. The reflective layer 13 which is configured by using metal in the present embodiment is formed by vapor deposition of aluminum, and is a half mirror for which transmittance is approximately 70%, reflectance is approximately 5%, and absorptance is approximately 25% by only the reflective layer 13.

In a case where a dielectric multilayer film is used, the reflective layer 13 can achieve high transparency and reflectance compared to a metal vapor deposition film or the like. The dielectric multilayer film is formed by alternatingly laminating a plurality of a dielectric film having a high refractive index (hereinafter referred to as a high refractive index dielectric film) and a plurality of a dielectric film having a low refractive index (hereinafter referred to as a low refractive index dielectric film). The high refractive index dielectric film is formed from $TiO_2$ (titanium dioxide), $Nb_2O_5$ (niobium pentoxide), $Ta_2O_5$ (tantalum pentoxide), or the like, for example. The refractive index of the high refractive index dielectric film is approximately 2.0 to 2.6.

The reflective layer 13 formed from a dielectric multilayer film has higher transparency than a reflective layer formed by a metal vapor deposition film where the metal is aluminum or the like, and can achieve high reflectance and low light absorption loss.

In a case of using a single layer dielectric film, the reflective layer 13 is formed from ZnS (zinc sulfide), $TiO_2$ (titanium dioxide), $Nb_2O_5$ (niobium pentoxide), $Ta_2O_5$ (tantalum pentoxide), $SiO_2$ (silicon dioxide), $MgF_2$ (magnesium fluoride), or the like, for example. The film thickness of the dielectric film is approximately 20 to 100 nm. This reflective layer 13 has a reflectance of approximately 5 to 20% and a transmittance of approximately 80 to 95%, with respect to light in the wavelength range of visible light. When the entirety of the screen 10 is viewed, the transmittance for the entirety of the screen 10 is approximately 70 to 85% because there is also a reflective component (approximately 10%) on the surface of the screen 10. The reflective layer 13 which uses a single layer dielectric film has higher transparency than a reflective layer formed by a metal vapor deposition film where the metal is aluminum or the like, can achieve high reflectance and low light absorption loss, and has high light utilization efficiency. The reflective layer 13 according to the present embodiment is formed from a ZnS (zinc sulfide) dielectric film. Note that, regardless of which material is used, the thickness of the reflective layer 13 may be appropriately set in accordance with properties of the material or desired optical performance, for example.

The second optical shape layer 14 is a layer that has optical transparency and is provided on the rear surface side (−Z side) of the first optical shape layer 12. The second optical shape layer 14 is added so as to fill the valley portions between unit optical shapes 121, and the surface on the rear surface side (−Z side) of the first optical shape layer 12 is planarized. The surface on the image source side (+Z side) of the second optical shape layer 14 is formed with a plurality of shapes roughly opposite to the unit optical shapes 121 of the first optical shape layer 12 arranged thereon. Material having the same refractive index as the first optical shape layer 12 is used for the second optical shape layer 14. By providing the second optical shape layer 14 as described above, it is possible to ensure transparency for the screen 10, and it is possible to protect the reflective layer 13. By providing the second optical shape layer 14 as described above, it becomes easier to laminate the protective layer 15 or the like on the rear surface side of the screen 10.

The refractive index of the second optical shape layer 14 is preferably approximately equal to the refractive index of the first optical shape layer 12 (a state where there is a small difference in refractive indexes of a level where the refractive indexes can be treated as being equal), and desirably equal. The second optical shape layer 14 may be formed using the same resin as that of the first optical shape layer 12 described above, and may be formed using a resin different to that of the first optical shape layer 12. The second optical shape layer 14 according to the present embodiment is formed by the same UV curable resin as the first optical shape layer 12.

The protective layer 15 has optical transparency and is formed on the rear surface side (−Z side) of the second optical shape layer 14, and has a function of protecting the rear surface side (−Z side) of the screen 10. A sheet-shaped member made of resin having high optical transparency is used for the protective layer 15. For example, a sheet-shaped member formed using a material similar to that of the base material layer 11 described above may be used for the protective layer 15. The protective layer 15 may be omitted.

In the screen 10 according to the present embodiment, the reflective layer 13 is formed on the first slope 121a and the second slope 121b which have fine uneven shapes, and the surface of the reflective layer 13 that is to be the reflective surface and is on the first optical shape layer 12 side is a matte surface (rough surface). Accordingly, some of the light incident on the first slope 121a is diffusely reflected. Herein, in the direction in which the unit optical shapes 121 are arranged, K represents an angle at which the light (reflected light) exiting from the screen 10 has a peak luminance after entering the relective layer 13 from the first slope 121a and being diffused and reflected. With respect to the angle K, K1 and K2 represent angles at which the luminance is ½ of the peak in the direction in which the unit optical shapes 121 are arranged (the screen up/down direction in the present embodiment). Moreover, +$\alpha_v$1 (where K+$\alpha_v$1=K1) and −$\alpha_v$2 (where K−$\alpha_v$2=K2) represent amounts of angle change from the angle K for peak luminance to the angles K1 and K2 where the luminance is ½. Furthermore, $\alpha_v$ (hereinafter referred to as the ½ angle $\alpha_v$) represents the average of the absolute values of the amounts of angle change from the peak luminance angle to the angles at which the luminance is ½. In this case, the ½ angle $\alpha_v$ is preferably greater than or equal to 5° and less than or equal to 45° (5°≤$\alpha_v$≤45°). The case in which $\alpha_v$<5° is not desirable because the viewing angle becomes too narrow and the image becomes hard to see. The case in which $\alpha_v$<5° is also not desirable because a specular reflection component in the reflected light increases and glare from the light source occurs, for example. The case in which $\alpha_v$>45° is not desirable because, although the viewing angle widens, the brightness of the image decreases, blurring of the image strengthens, and the contrast of the image decreases due to reflection of outside light by the surface of the screen 10. Accordingly, it is desirable for the ½ angle $\alpha_v$ to be in the above range.

In order to sufficiently diffuse the image light and achieve a good viewing angle, it is necessary for a mirror region to be 5% or less of the unit area of the reflective layer 13 formed on the first slope 121a, and ideally 0%. The mirror region is where the first slope 121a is not a rough surface, in other words is a region where the fine uneven shape is not formed, and is where the reflective surface of the reflective layer 13 is mirror-like and specularly reflects incident image light. The case in which the mirror region, which is not a rough surface, exceeds 5% of the unit area of the first slope 121a is not desirable because there will be bright rays in accordance with an image light component that are reflected and reaches the observer O side without being diffused, and because the viewing angle decreases.

Figure 6:
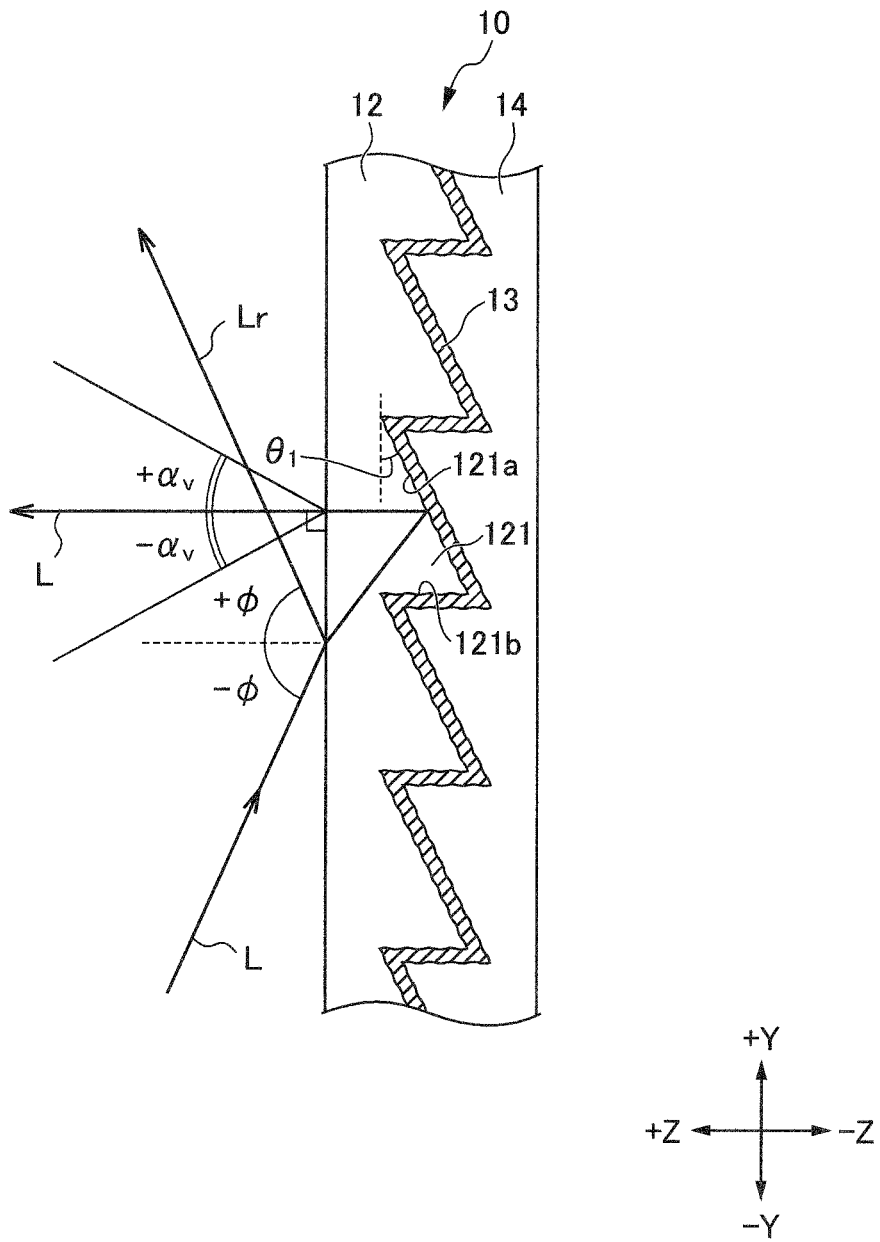

FIG. 6 is a view describing the relationship between the ½ angle $\alpha_v$, the incident angle φ of the image light, and the angle θ1 of the first slope 121a. In order to facilitate understanding, FIG. 6 simplifies the configuration inside the screen 10, and omits the base material layer 11 and the protective layer 15. In FIG. 6, in relation to the angles $\alpha_v$ and φ, the screen upper side with respect to the normal of the screen surface is illustrated as + and the screen lower side is illustrated as −. The angle θ1 of the first slope 121a is designed on the basis of, for example, the refractive index of each layer so that the image light is reflected to an observer who is positioned in front of the screen 10 with the best efficiency, in other words so that the angle K where the reflected light has peak luminance is 0°. In addition, it is envisioned that the range of −$\alpha_v$ to +$\alpha_v$ is such that the observer positioned in front of the screen satisfactorily observes the image. When, at a point in the screen up/down direction (direction in which the unit optical shapes 121 are arranged), the image light L is incident at the incident angle φ downward from the screen 10, proceeds through the first optical shape layer 12 which has a refractive index n, is incident on the first slope 121a that forms the angle θ1 with respect to the screen surface, is reflected by the reflective layer 13, and exits from the screen 10 in a direction orthogonal to the screen surface (exit angle 0°), the angle θ1 is expressed by the following formula (1).

$$\theta1 = \tfrac{1}{2} \times \arcsin((\sin \varphi)/n) \qquad \text{(Formula 1)}$$

When projecting the image light from the image source LS to cause the screen 10 to reflect the image light and display an image as in the present embodiment, there are cases where a problem occurs in that there is glare from the light source of the image source LS that projects the image light and the contrast of the image decreases. Image light that is reflected by the surface of the screen and reaches an observer is the main cause of glare from the image source. In order to prevent such glare from the image source, it is desirable for image light reflected by the surface of the screen to proceed outside of the angle range (−$\alpha_v$ to +$\alpha_v$) that is mainly for an observer to observe the image satisfactorily on the surface of the screen 10. When a portion Lr of the image light L which is incident at the incident angle φ is reflected by the screen surface, the angle of reflection is φ. Accordingly, it is desirable to have $α_v<φ$ in order to prevent glare from the image source.

Accordingly, from formula (1) described above, in the screen up/down direction (direction in which the unit optical shapes 121 are arranged), it is desirable for the ½ angle $α_v$ to satisfy the following formula (2) in at least a partial region of the screen 10 (for example, the screen center) with respect to the angle θ1 of the first slope 121a, in order to prevent glare from the image source.

$$α_v<\arcsin(n×\sin(2×(θ1))) \quad \text{(Formula 2)}$$

In order to prevent glare from the image source, it is more desirable for the ½ angle $α_v$ to satisfy the above formula (2) in every region of the screen 10, with respect to the angle θ1 of the first slope 121a. In a mode in which the angle θ1 and the ½ angle $α_v$ satisfy the above formula (2), light reflected by the surface of the screen 10 when the light is incident on the screen 10 mainly travels in a direction (+φ direction) outside of the range in which image light reflected by the reflective layer 13 travels after exiting from the screen 10 ($-α_v$ to $+α_v$). By this, it is possible to reduce glare from the image source LS and display a good image with high contrast in the range of $-α_v$ to $+α_v$. In addition, letting the average of absolute values of amounts of angle change from peak luminance in the direction in which the unit optical shapes 121 extend to ½ luminance be $α_H$ (this is referred to below as the ½ angle $α_H$), the screen 10 according to the present embodiment satisfies the relationship $α_v>α_H$.

The screen 10 is formed by a manufacturing method as follows, for example. The base material layer 11 is prepared, and the first optical shape layer 12 is formed by a UV molding method in which one surface of the base material layer 11 is laminated with a UV curable resin in a state where the UV curable resin is filled in a shaping mold that shapes the unit optical shapes 121, and the resin is irradiated with ultraviolet rays to cure the resin. The shaping mold that shapes the unit optical shapes 121 has surfaces that shape the first slope 121a, the second slope 121b, and the connection surface 121c. Fine uneven shapes are formed on these shapes at this point. The fine uneven shapes can be formed on the surfaces of the shaping mold for shaping the first slope 121a, the second slope 121b, and the connection surface 121c, for example, by combining plating, etching, blasting, or the like. After the first optical shape layer 12 is formed on one of the surfaces of the base material layer 11, the reflective layer 13 is formed on the first slope 121a, the second slope 121b, and the connection surface 121c by vapor deposition, for example.

Subsequently, from above the reflective layer 13, a UV curable resin is applied so as to fill the valley portions between the unit optical shapes 121 and achieve a planar shape, the protective layer 15 is laminated, and the UV curable resin is cured to integrally form the second optical shape layer 14 and the protective layer 15. Subsequently, by, for example, cutting into a predetermined size, the screen 10 is completed. The base material layer 11 and the protective layer 15 may be sheet-like and may be web-like. When the base material layer 11 and the protective layer 15 are web-like, it is possible to contiguously manufacture a plurality of the screen 10 in a pre-cutting state, and it is possible to improve the efficiency of producing the screen 10, and reduce the production cost.

Figure 7:
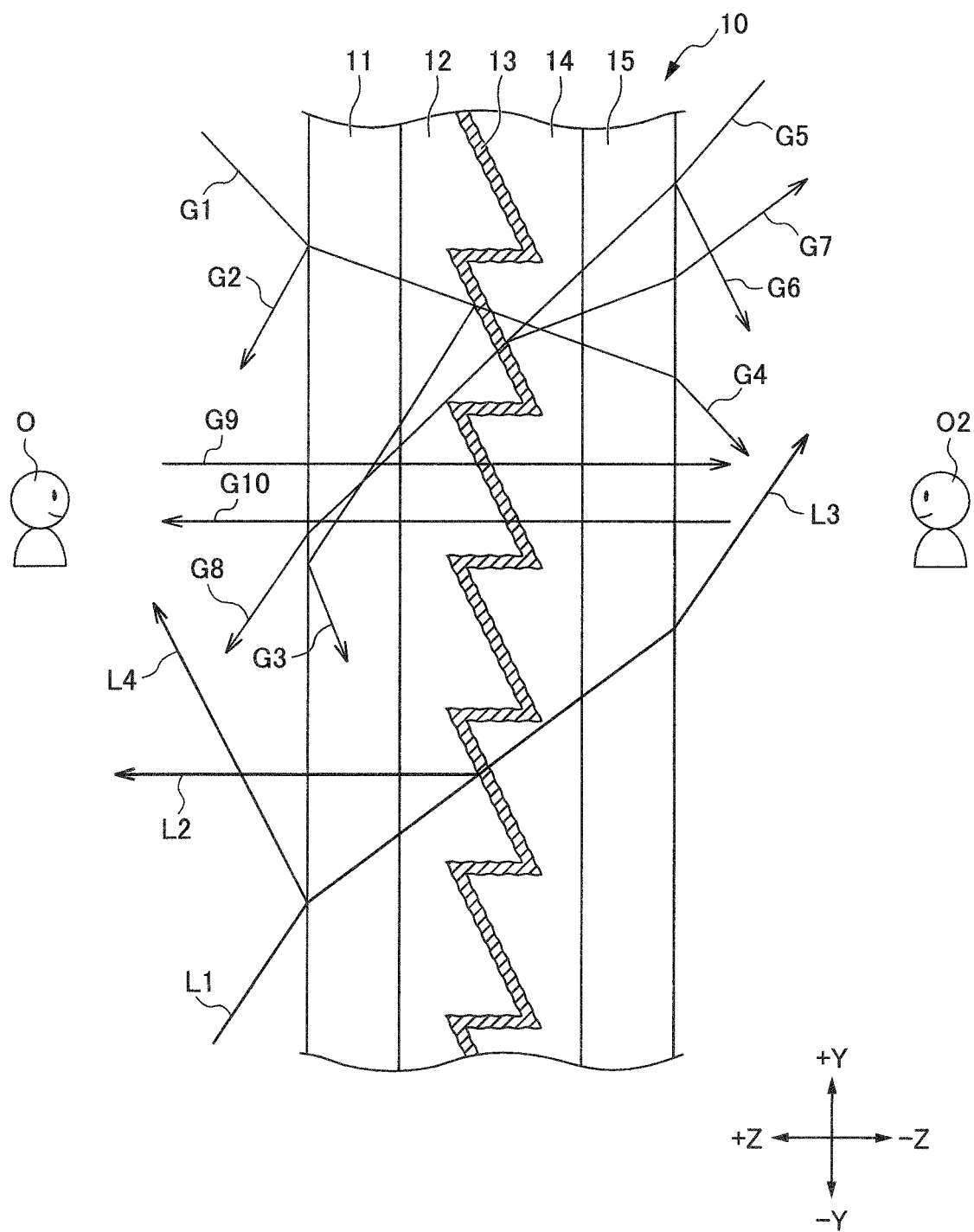
FIG. 7 is a view that illustrates a situation for image light and outside light with the screen 10 according to the present embodiment.

FIG. 7 is a view that illustrates a situation for image light and outside light with the screen 10 according to the present embodiment. FIG. 7 illustrates an enlarged portion of a cross-section parallel to the direction (Y direction) in which the unit optical shapes 121 are arranged and the thickness direction (Z direction) of the screen. In order to facilitate understanding, FIG. 7 is illustrated with no differences in refractive index at the interfaces of respective layers in the screen 10, including an adhesion layer 30 and a light control layer 20. Image light L2, which is a portion of image light L1 that is projected from the image source LS positioned downward from the screen 10 and is incident on the screen 10, is incident on the first slope 121a and the connection surface 121c of each unit optical shape 121, is diffusely reflected by the reflective layer 13, and exits on the observer O1 side.

Other image light L3, which is a part of the image light that was incident on the first slope 121a and the connection surface 121c but was not reflected, penetrates the reflective layer 13 and exits from the rear surface side (−Z side) of the screen 10. At this point, the image light L3 exits upward from the screen 10, and does not reach an observer O2 positioned in front of the rear surface side of the screen 10. Image light L4, which is a portion of the image light L1 projected from the image source LS, is reflected by the surface of the screen 10 on the image source side, but proceeds upward from the screen 10 and thus does not obstruct visual recognition of the image by the observer O1. In the present embodiment, because the image source LS is positioned downward from the screen 10, the image light L1 is projected onto the screen 10 from a downward direction with respect to the screen 10, and the angle θ2 of the second slope 121b (refer to FIG. 3) is larger than the incident angle of image light at each point in the screen up/down direction of the screen 10, the image light is not directly incident on the second slope 121b, and the second slope 121b has practically no influence on reflection of the image light.

Next, description is given regarding light from the outside world (hereinafter referred to as outside light), such as sunlight, that is not the image light and is incident on the screen 10 from the rear surface side (−Z side) or the image source side (+Z side). As illustrated by FIG. 7, some outside light G2 and G6, which is a part of outside light G1 and G5 that is incident on the screen 10, is reflected by surfaces of the screen 10, and proceeds downward from the screen. Some outside light G3 and G7 is reflected by the reflective layer 13. For example, the outside light G3 is totally reflected by the surface on the image source side (+Z side) of the screen 10 and proceeds downward inside the screen 10, and the outside light G7 exits upward outside of the screen on the rear surface side (−Z side). Other outside light G4 and G8 that is not reflected by the reflective layer 13 penetrates the reflective layer 13, and exits on the rear surface side and the image source side, respectively. At this point, the outside light G2, G3, and G8 that exits on the image source side do not reach the observer O, and thus it is possible to suppress a decrease in the contrast of the image.

Some of the outside light incident on the screen 10 is totally reflected by the surface on the image source side or the rear surface side of the screen 10, and attenuates by proceeding downward inside the screen. Other outside light G9 and G10 penetrates the reflective layer 13, and exits on the rear surface side and the image source side, respectively. Because the screen 10 does not comprise, for example, a diffusion material that comprises diffusion particles, the outside light G9 and G10 that penetrates the screen 10 is not diffused. Accordingly, when observing a view on the other side of the screen 10 through the screen 10, it is possible to observe through the screen 10 with high transparency, without the view on the other side of the screen 10 becoming dim or being washed white.

As described above, the screen 10 according to the present embodiment does not comprise a light diffusion layer that includes a diffusion material such as particles that have a diffusing action, and the fine uneven shape of the reflective layer 13 is what has the diffusing action.

A conventional semi-transparent type reflective screen that is provided with a diffusion layer that includes diffusion particles has a problem in that, although a good viewing angle is achieved, the image resolution is reduced. This is because the image light is diffused twice—before and after being reflected by the reflective layer. In addition, because outside light is also diffused by the diffusion particles, the view on the other side of the screen is observed as dim or washed white, and the transparency is reduced.

However, in the screen 10 according to the present embodiment, the surface on the image source side of the reflective layer 13 has a fine uneven shape, and thus the image light is only diffused when it is reflected. In the screen 10 according to the present embodiment, only light reflected by the reflective layer 13 is diffused, and transmitted light is not diffused. Accordingly, the screen 10 according to the present embodiment can display an image that has a good viewing angle and a good resolution, and can achieve high transparency where the view on the other side of the screen 10 can be satisfactorily recognized visually by the observer O1 without being washed white or blurred. In addition, with the screen 10 according to the present embodiment, even in a state where the image light is projected onto the screen 10, the observer O1 can make a partial visual recognition of the view on the other side (rear surface side) of the screen 10. Furthermore, with the screen 10 according to the present embodiment, the observer O2 who is positioned on the rear surface side is capable of satisfactorily visually recognizing, with high transparency through the screen 10, the view on the image source side (+Z side) past the screen 10, irrespective of whether the image light is being projected.

In a case of measuring the angular luminance distribution in a situation where the image light is projected under a condition where the front of the center of the screen has the maximum luminance, it is desirable for the half-value angle in the direction in which the unit optical shapes 121 are arranged to be greater than the half-value angle in a direction orthogonal to the arrangement direction by 5% or more, and more desirably greater by 20% to 100% or more. By this, it is possible to increase the degree of freedom of a position at which to install the image source LS.

As described above, with the screen 10 according to the first embodiment, by providing the connection surface 121c, the light diffusing action in the direction in which the unit optical shapes 121 are arranged is greater than the light diffusing action in a direction orthogonal to the arrangement direction. Accordingly, the screen 10 according to the first embodiment has a high degree of freedom of relative positions for the screen 10 and the image source LS, and can display a good image.

It is possible to protect the rear surface side of the reflective layer 13 because the screen 10 is provided with the second optical shape layer 14, which has optical transparency and fills the unevenness between the plurality of unit optical shapes 121 that are arranged, on the surface on the rear surface side of the reflective layer 13 and the first optical shape layer 12. Because it is possible to have the surface on the rear surface side of the screen 10 flat, for example, in a case of causing the screen 10 to be held between two glass plates that configure laminated glass or pasting the screen 10 to a glass plate, it is possible to arrange the screen 10 with respect to the glass plate(s) without any gap.

Furthermore, with the screen 10 according to the first embodiment, the unit optical shapes 121 of the first optical shape layer 12 have a circular Fresnel lens shape in which the plurality of the unit optical shapes 121 are arranged in concentric circles, with an optical center C1 of the circular Fresnel lens shape positioned outside of the display region of the reflective screen. By this, the screen 10 can display a good image with high surface uniformity for brightness and without the image darkening in the screen left/right directions, even with image light having a high incident angle that is projected from a short focus type image source LS positioned lower in the screen up/down direction and outside of the display region of the screen 10. In a case where the reflective layer 13 is formed from a dielectric film, the screen 10 can suppress absorption of light incident on the reflective layer 13 as much as possible and reflect some of the incident light, and also allow the remaining portion of incident light to penetrate through to the rear surface side of the screen 10, and can improve the utilization efficiency of the incident light.

Modification of First Embodiment

In the first embodiment, description was given for an example of a configuration in which the light diffusing action in the direction in which the unit optical shapes 121 are arranged is greater than the light diffusing action in a direction orthogonal to the arrangement direction by providing the connection surface 121c which is configured by a curved surface between the first slope 121a and the second slope 121b of each unit optical shape 121. There is no limitation to this, and description is given below for a modification that has a configuration that provides anisotropy to a light diffusion (deflection) action by more actively controlling light distribution characteristics for the image light.

FIG. 8 is a view that illustrates a modification of the first embodiment with a similar cross-section to FIG. 3. Note that FIG. 8 illustrates a single line without representing the thickness of the reflective layer 13, in order to make the shape of a first surface 121d and a second surface 121e easier to understand. Due to the same reason, FIG. 8 illustrates by omitting the fine uneven shape provided in the unit optical shapes 121.

Each unit optical shape 121 of the modification illustrated in FIG. 8 has, in the cross-sectional shape cut in the arrangement direction, vertices T that protrude the most on the side opposite the image source side, and a valley bottom portion V that is depressed the most on the image source side. In addition, bordered by the vertices T and the valley bottom portion V, each unit optical shape 121 has the first surface 121d on a side where the width is wider in the arrangement direction, and the second surface 121e on the side where the width is narrower. The first surface 121d and the second surface 121e face one another. In the example illustrated in FIG. 8, both of the first surface 121d and the second surface 121e have a configuration in which the cross-sectional shape that is cut in the arrangement direction is curved. The curved surface of the optical shape layer 12 is continuous at the valley bottom portion V, and discontinuous at the vertices T. In other words, in the aforementioned cross-sectional shape, the valley bottom portion V is a curved shape, and the vertices T are acute angles. With such a configuration, it is possible to more actively control the light distribution characteristics for the image light, and it is possible to make the light diffusing action in the direction in which the unit optical shapes 121 are arranged to be larger than the light diffusing action in a direction orthogonal to the arrangement direction.

Second Embodiment

Figure 9:
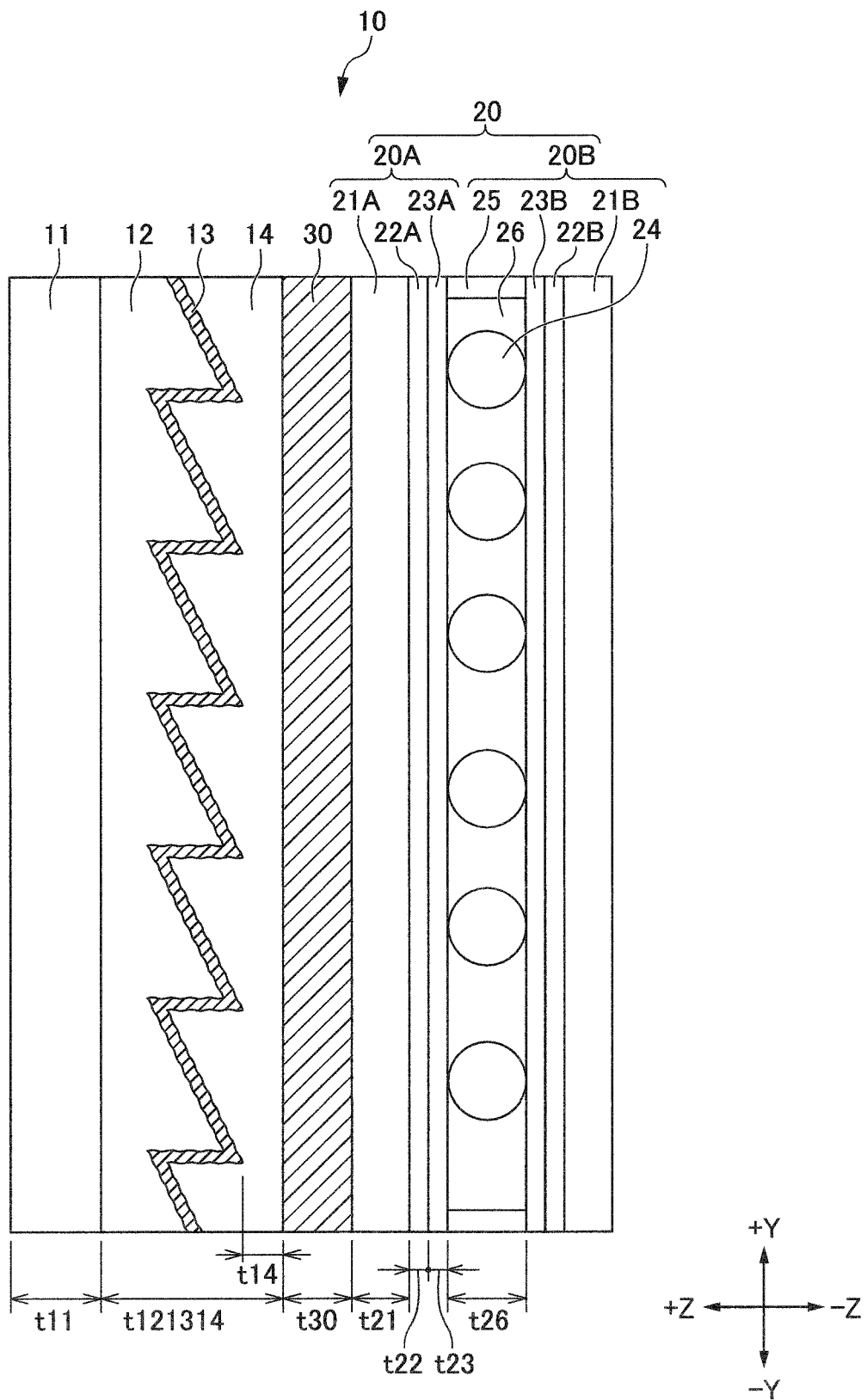
FIG. 9 is a view that illustrates an example of a layer structure of the screen 10 according to a second embodiment.

FIG. 9 is a view that illustrates an example of a layer structure of the screen 10 according to a second embodiment. The screen 10 according to the second embodiment has a mode in which the adhesion layer 30 and the light control layer 20 are provided in place of the protective layer 15 in the first embodiment, and other configurations are similar to that of the screen 10 in the first embodiment. Accordingly, the same reference symbols are applied to portions that achieve a similar function to that in the first embodiment described above, and duplicate descriptions are omitted, as appropriate. By being provided with the light control layer 20 through the adhesion layer 30, the screen 10 according to the second embodiment is capable of selectively changing the transmittance of light that penetrates the screen 10.

The light control layer 20 illustrated in FIG. 9 is a film which enables the amount of transmitted light to be controlled by causing an applied voltage to change. The light control layer 20 is bonded to the rear surface side of the second optical shape layer 14 across the adhesion layer 30, and enables the amount of transmitted light to be controlled. As the reflective screen portions (reference symbols 11 to 14) and the light control layer 20 are bonded without being separately provided, there is one less air interface for incident light, and thus the screen 10 according to the present embodiment has an advantageous configuration for increasing transmittance in proportion to this.

The light control layer 20 is a guest host type liquid crystal cell that uses a dichroic pigment, and causes the amount of transmitted light to change in accordance with an electric field applied to the liquid crystal. The light control layer 20 is configured by sandwiching a liquid crystal layer 26 between a film-like second laminate 20B for liquid crystals and a first laminate 20A for liquid crystals. The second laminate 20B for liquid crystals is formed by laminating a transparent electrode 22B, an orientation layer 23B, and bead spacers 24 on a base material 21B. The first laminate 20A for liquid crystals is formed by laminating a transparent electrode 22A, and an orientation layer 23A, on a base material 21A. By the transparent electrodes 22B and 22A provided in the first laminate 20A for liquid crystals and the second laminate 20B for liquid crystals being driven, the light control layer 20 causes the orientation of the liquid crystal material in accordance with the guest host liquid crystal composition provided in the liquid crystal layer 26 to change and thereby causes the amount of transmitted light to change. Note that the configuration of the light control layer 20 illustrated in FIG. 9 can, for example, be replaced with a configuration disclosed in Japanese Unexamined Patent Application, Publication No. 2017-187810, and the specific configuration can be changed as appropriate.

Next, two more specific examples of the screen 10 according to the present embodiment will be given, and description will be made regarding the effect and the transmittance of these examples.

Example 1

With the screen 10 of example 1, the light control layer 20 is of the guest host type illustrated in FIG. 9. The arrangement pitch P of the unit optical shapes 121 is 100 μm. The reflective layer 13 is formed from an aluminum deposited film, and has a thickness of approximately 5 Å, a transmittance of 70%, and a reflectance of 5%. The base material layer 11 is made of PET resin, and the thickness t11 of the base material layer 11 was set to 100 μm. A urethane acrylate UV curable resin (refractive index 1.52) was used as the material of the first optical shape layer 12 and the second optical shape layer 14. The thickness t121314 resulting from combining the first optical shape layer 12, the reflective layer 13, and the second optical shape layer 14 was set to 100 μm. The minimum distance t14 from the surface of the second optical shape layer 14 on the rear surface side to the reflective layer 13 was set to 300 μm. The thickness t30 of the adhesion layer 30 was set to 10 μm. Polycarbonate film was used for the material of the base material 21A and 21B, and the thickness t21 of the base material 21A and 21B was set to 100 μm. Indium tin oxide (ITO) was used for the material of the transparent electrodes 22A and 22B, and the thickness t22 was set to 100 μm. A polyimide resin was used for the material of the orientation layers 23A and 23B, and the thickness t23 was set to 0.1 μm. Liquid crystals that use a guest host liquid crystal composition that uses a dichroic pigment composition were used for the liquid crystal layer 26, and the thickness t26 was set to 6.2 μm. The liquid crystal layer has a normally clear structure. With the above configuration, the minimum distance between the reflective layer 13 and the liquid crystal layer 26 is 0.1 mm, and is kept to less than or equal to 0.5 mm.

Example 2

Regarding the screen 10 of the example 2, only differences with the example 1 will be described. With the screen 10 of example 2, the light control layer 20 is of a non-guest-host type. The reflective layer 13 is configured by a dielectric multilayer film, and is specifically configured by laminating $TiO_2$ and $SiO_2$. The linear polarizing plates 29A and 293 are manufactured by impregnating iodine into polyvinyl alcohol (PVA), subsequently stretching a result of the impregnation to form an optical functional layer that fulfills an optical function as a linear polarizing plate, and sandwiching the optical functional layer with base material in accordance with transparent film material such as TAC (triacetyl cellulose) or the like. The thickness t29 of the linear polarizing plates 29A and 29B is set to 200 μm. Liquid crystals in which the dielectric constant anisotropy is negative are used for a liquid crystal layer 27, and the thickness t27 of the liquid crystal layer is set to 3.5 μm. The liquid crystal layer 27 differs from the liquid crystal layer 26 in example 1, and has a normally dark configuration. With the above configuration, the minimum distance between the reflective layer 13 and the liquid crystal layer 26 is 0.3 mm, and is also kept to less than or equal to 0.5 mm in example 2.

In both of example 1 and example 2, because the minimum distance between the reflective layer 13 and the liquid crystal layer 26 is less than or equal to 0.5 mm, it is possible to make it easier to bond them together at a time of manufacture, and it is possible to make it easier to ensure uniformity of the thickness.

FIG. 10 is a table that summarizes transmittances of the example 1 and the example 2. The "ON" and "OFF" in fields for the light control layer portions in FIG. 10 indicate that supply of power to the light control layer 20 is on or off, and the behavior is configured to be opposite between example 1 which is normally clear and example 2 which is normally dark. As indicated in FIG. 10, in example 1, if supply of power to the light control layer 20 can be performed, it is possible to reduce the transmittance of the entirety of the screen 10 to 14%, and while it is possible to faintly visually recognize the background in a region where the image is not being projected, it is possible to observe the image at high contrast by suppressing the influence of the background in the region where the image is projected. It is also possible to suppress light leaking to the background side. In example 2, if supply of power to the light control layer 20 is turned off, it is possible to block approximately all transmitted light from the background, and it is possible to observe the image after eliminating approximately all of the influence of the background. In example 2, the reflectance of the reflective layer 13 decreases, but because the influence of the background ceases, it is possible to observe a sufficiently good image, but a better image will be observable when the amount of light from the image source LS is increased.

As indicated in FIG. 10, by combining the configuration of the reflective layer 13 and the configuration of the light control layer 20 under appropriate conditions, it is possible to set the transmittance for the entirety of the screen 10 to be in a range of greater than or equal to 10% and less than or equal to 50%, in a state where the transmittance of the light absorption layer exemplified as the light control layer 20 becomes highest. Accordingly, it is possible to observe the background satisfactorily. In a state where the transmittance of the light absorption layer (light control layer 20) becomes lowest, it is possible to enter a state where the background is essentially not transmitted through the screen 10, and it is possible to observe the image with essentially no influence from the background.

Because the light control layer 20 is bonded and integrated with the layer that comprises the reflective layer, there is no air gap portion between them in both of example 1 and example 2. By this, it is possible to achieve high transmittance as indicated in FIG. 10. The light control layer 20 is provided for the entire surface of the screen 10, and thus it is possible to cause the transmittance of the entirety of the screen 10 to change. The light control layer 20 ceases to be influenced from outside, such as by outside light, and it is possible to cause the transmittance of the light control layer 20 to change. Furthermore, with the mode of example 2, it is possible to prevent the occurrence of light leakage in accordance with the linear polarizing plates 29A and 29B by aligning the polarization states of light sources.

By virtue of the second embodiment as described above, the screen 10 is provided with the light control layer 20 and thus enables the transmittance of light to be selectively changed by turning supply of power to the light control layer 20 on or off. Accordingly, there is good usability as it is possible to have usage in which the transmittance is set high when there is a desire to view the background through the screen 10, and the transmittance is set low when there is a desire to make the image easier to see.

Third Embodiment

Figure 11:
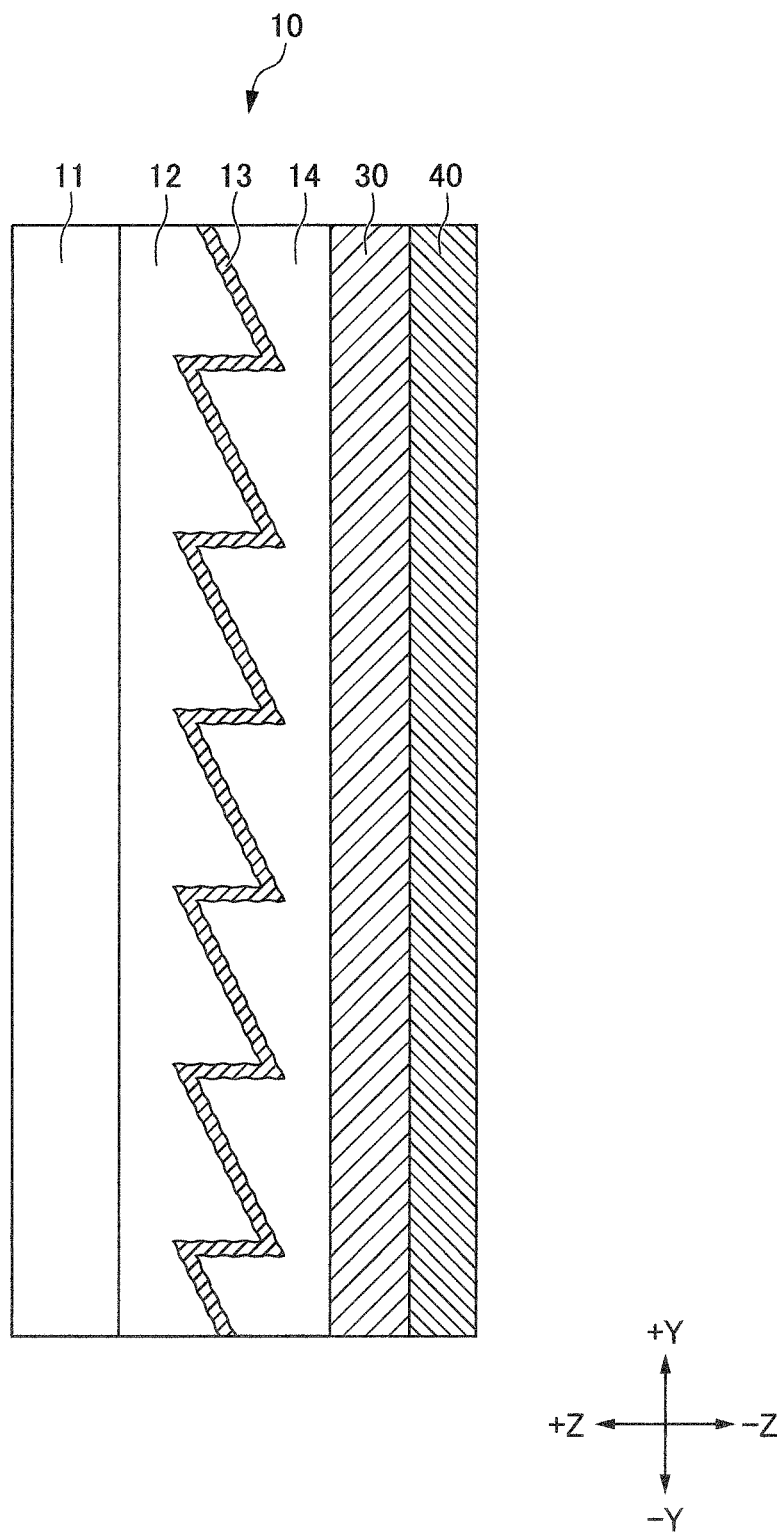
FIG. 11 is a view that illustrates an example of a layer structure of the screen 10 according to a third embodiment.

FIG. 11 is a view that illustrates an example of a layer structure of the screen 10 according to a third embodiment. The screen 10 according to the third embodiment has a mode in which the light control layer 20 in the second embodiment is made to be a more simplified light control layer 40. Other than the light control layer 40, the configuration of the screen 10 is similar to the screen 10 according to the second embodiment. Accordingly, the same reference symbols are applied to portions that achieve a similar function to that in the second embodiment described above, and duplicate descriptions are omitted, as appropriate.

The light control layer 40 according to the third embodiment includes a photosensitive substance, and the transmittance of the light control layer 40 changes in accordance with the amount of ultraviolet rays that reach the light control layer 40. Specifically, the light control layer 40, for example, may be a light control glass layer that includes silver halide, and may be a light control resin layer that includes spirooxazine. It is possible to appropriately use a conventionally known photosensitive substance for the light control layer 40.

By virtue of the third embodiment as described above, the light control layer 40 has a configuration that includes a photosensitive substance, and thus it is possible to configure a light control layer with a simpler configuration.

Transmittance of Second Embodiment and Third Embodiment

The transmittance of the light control layers 20 and 40 according to the second embodiment and the third embodiment can be appropriately set in accordance with an intended use. Specific usage modes will be exemplified, and desirable transmittances for the light control layers 20 and 40 for this case will be exemplified.

Figure 12:
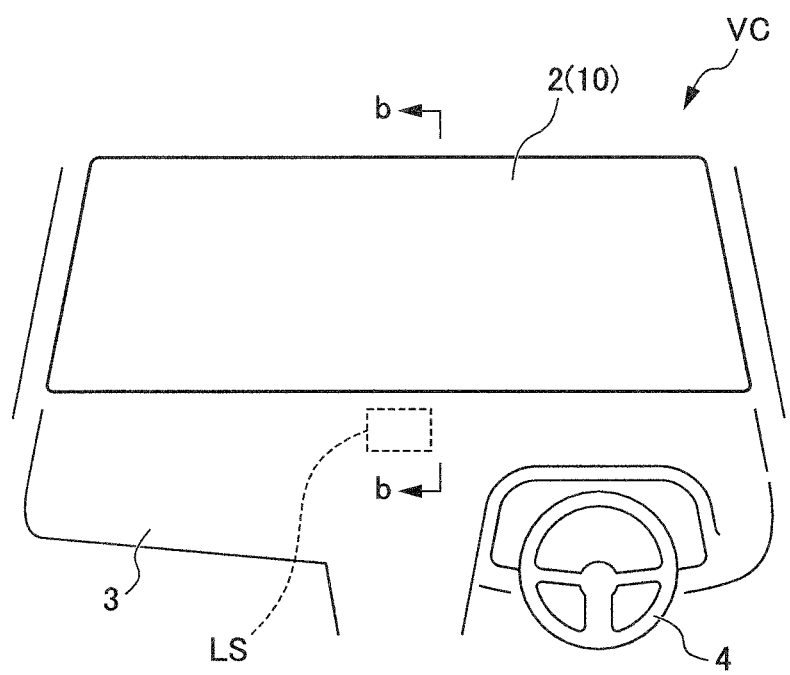
FIG. 12 is a view that illustrates the surroundings of the driver's seat in an automobile VC, where the image display device 1 according to the second embodiment is arranged on the front window of the automobile and is viewed from inside the vehicle.
Figure 13:
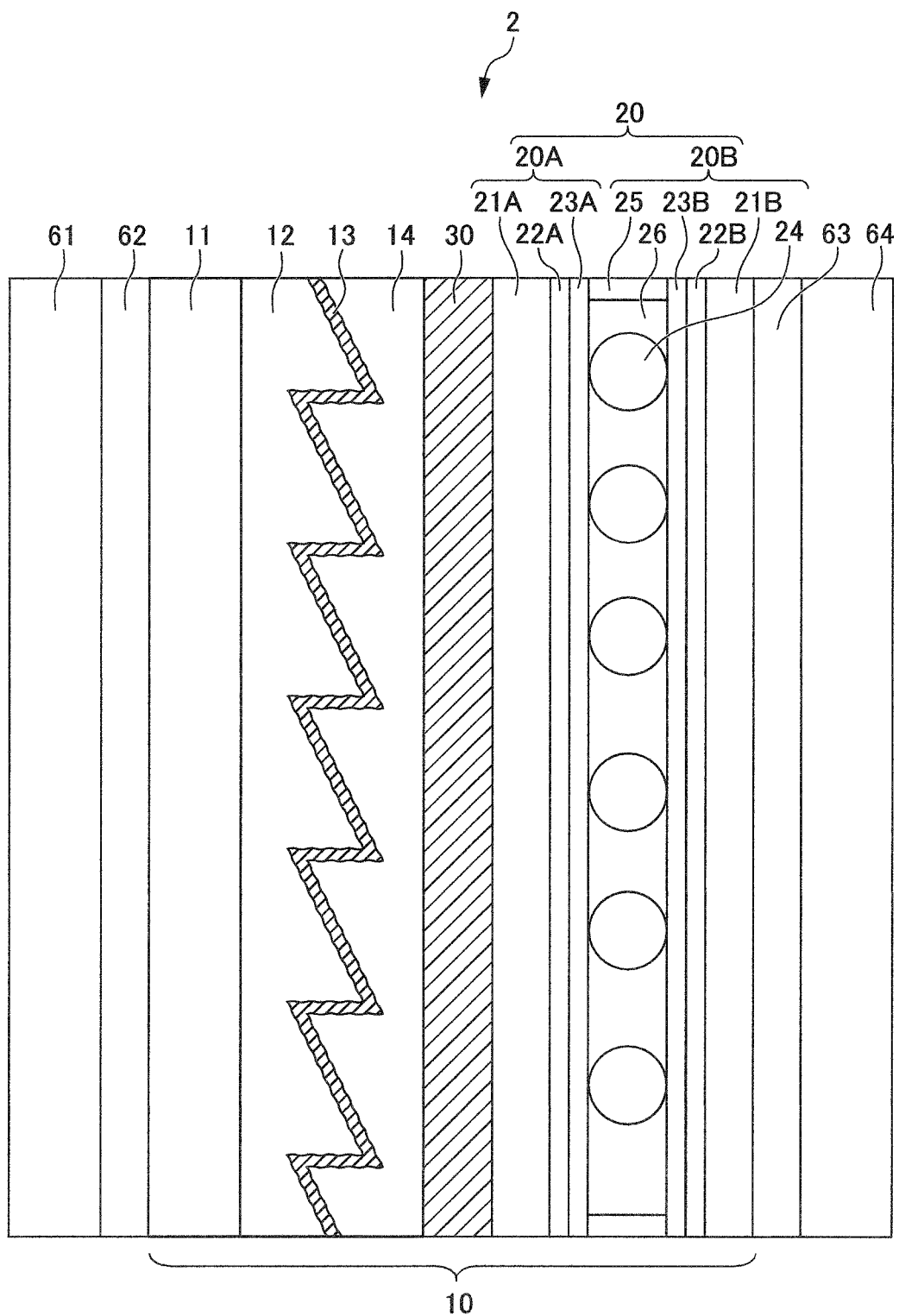
FIG. 13 is a b-b cross-section view of the front window 2 in FIG. 12.

FIG. 12 is a view that illustrates the surroundings of the driver's seat in an automobile VC, where the image display device 1 according to the second embodiment is arranged on the front window of the automobile and is viewed from inside the vehicle. FIG. 13 is a b-b cross-section view of the front window 2 in FIG. 12. FIG. 13 exemplifies an example in which the screen 10 according to the second embodiment is used, but the screen 10 according to the third embodiment can be similarly arranged and used.

In the example used in FIG. 12 and FIG. 13, the image display device 1 is arranged on the front window 2 of the automobile VC and nearby to the front window 2. Specifically, for the image display device 1, the screen 10 is on the entire surface of the front window 2 of the automobile VC, and the image source LS is arranged inside the interior panel 3 of the automobile VC. The driver sits in front of a steering wheel 4. By this, the image display device 1 according to the present embodiment can display the speed of the automobile, the state of a direction indicator, warnings such as for an approaching obstacle, and the like at a position on the front window 2 that does not obstruct the field of view of the driver, and, from among people on board the automobile VC, primarily enables the driver to confirm various items of information without greatly diverting their line of sight.

The screen 10 provided on the front window 2 displays an image by diffusely reflecting image light projected from the image source LS (a projector). Accordingly, the screen 10 cannot display a clear image even if the image light is projected from an image source such as a liquid crystal display device or an organic electroluminescence (EL) device.

As illustrated in FIG. 13, the front window 2 is configured by a so-called laminated glass mode, in which a first glass plate 61, a first intermediate layer 62, the screen 10, a second intermediate layer 63, and a second glass plate 64 are laminated in this order, from the inside of the automobile. The first glass plate 61 is a transparent member from the front window 2 that is arranged most on the side of the driver (inside of the vehicle). As the first glass plate 61, it is possible to use a material such as soda lime glass (blue plate glass), borosilicate glass (white plate glass), quartz glass, soda glass, or potash glass, for example. It is desirable for the thickness of the first glass plate 61 to be in the range of 2 to 3 mm, for example.

The first intermediate layer 62 is provided between the first glass plate 61 and the screen 10. The first glass plate 61 and the screen 10 are bonded by the first intermediate layer 62. The first intermediate layer 62 is provided to prevent fragments of the first glass plate 61 from scattering when the front window 2 is damaged. As the first intermediate layer 62, it is possible to use PVB (polyvinyl butyral), for example. It is desirable for the thickness of the first intermediate layer 62 to be in the range of 0.3 to 0.8 mm, for example. It is also desirable for the refractive index of the first intermediate layer 62 to be equal to the refractive indexes of the first glass plate 61 and the first optical shape layer 12 of the screen 10.

The second intermediate layer 63 is provided between the second glass plate 64 and the screen 10. The second glass plate 64 and the screen 10 are bonded by the second intermediate layer 63. The second intermediate layer 63 is provided to prevent fragments of the second glass plate 64 from scattering when the front window 2 is damaged. Similarly to the first intermediate layer 62, it is possible to use PVB (polyvinyl butyral), for example, for the second intermediate layer 63, and it is desirable for the thickness of the second intermediate layer 63 to be in the range of 0.3 to 0.8 mm. It is also desirable for the refractive index of the second intermediate layer 63 to be equal to the refractive indexes of the second glass plate 64 and the second optical shape layer 14 of the screen 10.

The second glass plate 64 is a transparent member from among the front window 2 that is arranged on the outermost side of the vehicle. Similarly to the first glass plate 61, it is possible to use a material such as soda lime glass (blue plate glass), borosilicate glass (white plate glass), quartz glass, soda glass, or potash glass, for example for the second glass plate 64. It is desirable for the thickness of the second glass plate 64 to be in the range of 2 to 3 mm, for example.

Description was given for an example in which the screen 10 according to the present embodiment is incorporated in the front window 2 which is configured by a laminated glass mode in which the screen 10 according to the present embodiment is sandwiched between two glass plates (31, 34) intermediated by intermediate layers (32, 33) as described above, but there is no limitation to this. The screen 10 may be pasted, through a bonding layer, onto the surface of the front window inside the vehicle, or onto the outermost surface of the front window.

By a configuration as above, a person on board the automobile VC (the driver) can observe the view outside of the vehicle through the entire surface of the front window 2 when the image light is not being projected, and, when the image light is being projected onto at least part of the front window 2 (the screen 10), can visually recognize the image light in regard to the portion of the front window 2 where the image light is being projected, and can observe the view outside the vehicle through other portions of the front window 2. It is also possible to somewhat observe the view outside the vehicle through the portion onto which the image light is being projected, and it is possible to check the image in a so-called see-through state.

Here, in a case where the screen 10 is applied to the window of a vehicle such as an automobile described above, it is desirable for the light absorption rate of the light control layer 20, 40 to be in a range such as the following. Firstly, when the light absorption rate of the entirety of the screen 10 is too low, there are cases where the screen 10 will appear as clouded due to outside light from the vehicle. When the light absorption rate of the light control layer is fixed in order to suppress this clouding phenomenon, it is desirable for the light absorption rate to be greater than or equal to 50%. It is also desirable to satisfy the following conditions in order to satisfy both of the forward field of view being good when the image light is not being projected, and enabling the image to be easily recognized when the image light is being projected. When the image light is not being projected, the light absorption rate of the light control layer 20, 40 is desirably low and most desirably 0%. When the image light is being projected, the light absorption rate of the light control layer 20, 40 is desirably 50% or more and more desirably 70% or more. It is desirable for the light control layer 20, 40 to have a variable light absorption rate and satisfy at least one of the above two conditions, and more desirably to satisfy both of the above two conditions.

Fourth Embodiment

Figure 14:
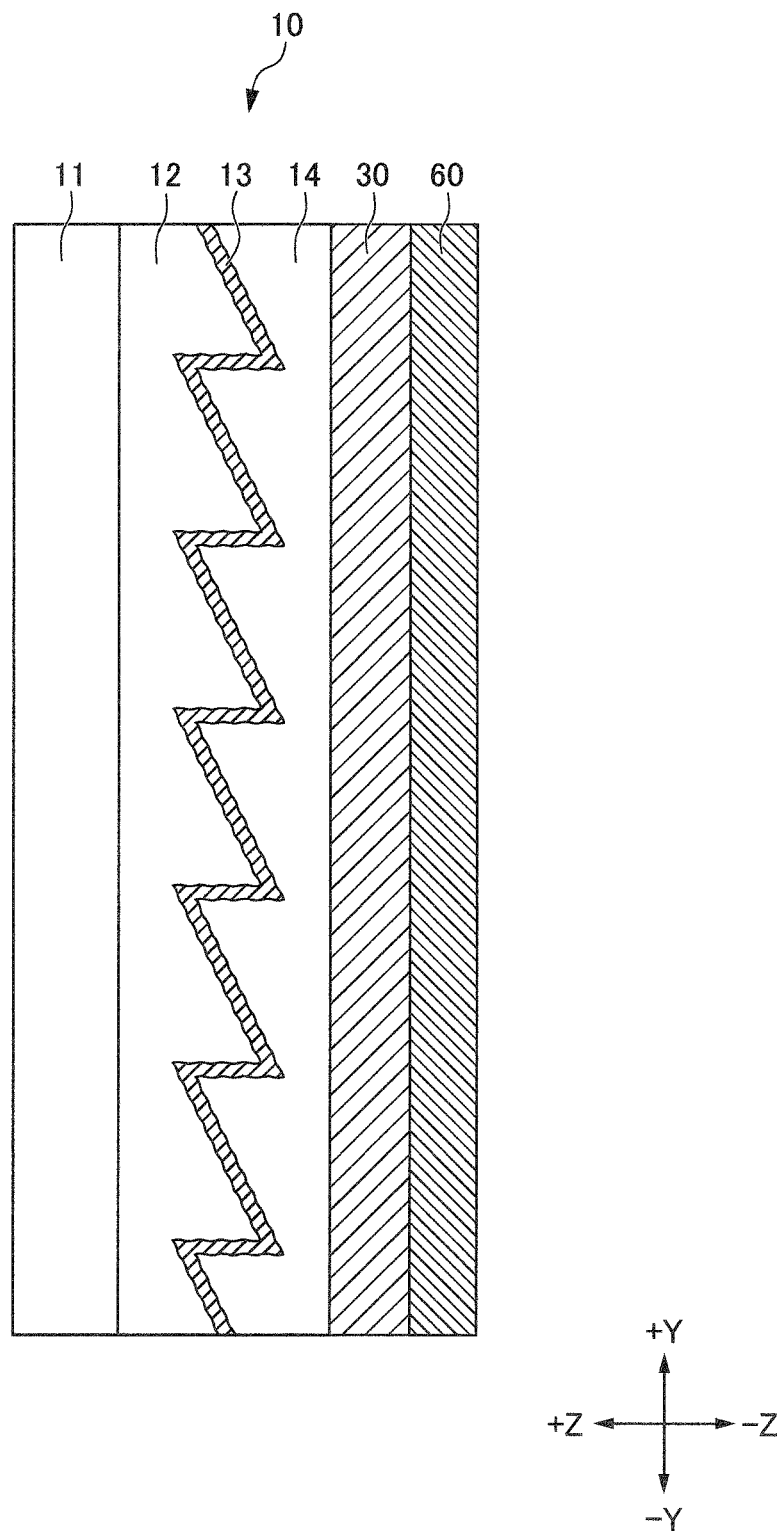
FIG. 14 is a view that illustrates an example of a layer structure of the screen 10 according to a fourth embodiment.

FIG. 14 is a view that illustrates an example of a layer structure of the screen 10 according to a fourth embodiment. The screen 10 according to the fourth embodiment has a mode in which the light control layer 20 in the third embodiment is made to be a more simplified light absorption layer 60. Other than the light absorption layer 60, the configuration of the screen 10 is similar to the screen 10 according to the third embodiment. Accordingly, the same reference symbols are applied to portions that achieve a similar function to that in the third embodiment described above, and duplicate descriptions are omitted, as appropriate.

The light absorption layer 60 according to the fourth embodiment has light absorption by being colored by a coloring material such as a dye or pigment that is colored gray or black, for example. For the light absorption layer 60, the concentration of the coloring and the thickness of the layer are set so that the light transmittance of the screen 10 becomes a predetermined value. The light absorption layer 60 therefore has a function of absorbing unnecessary outside light or stray light such as illumination light that is incident on the screen 10, and improving the contrast of the image. Even if the protective layer 15 in the first embodiment is caused to have a light absorption function, it is possible to achieve a similar effect.

By virtue of the fourth embodiment as described above, by providing the light absorption layer 60, it is possible to improve the contrast of the image by a simple configuration.

Fifth Embodiment

Figure 15:
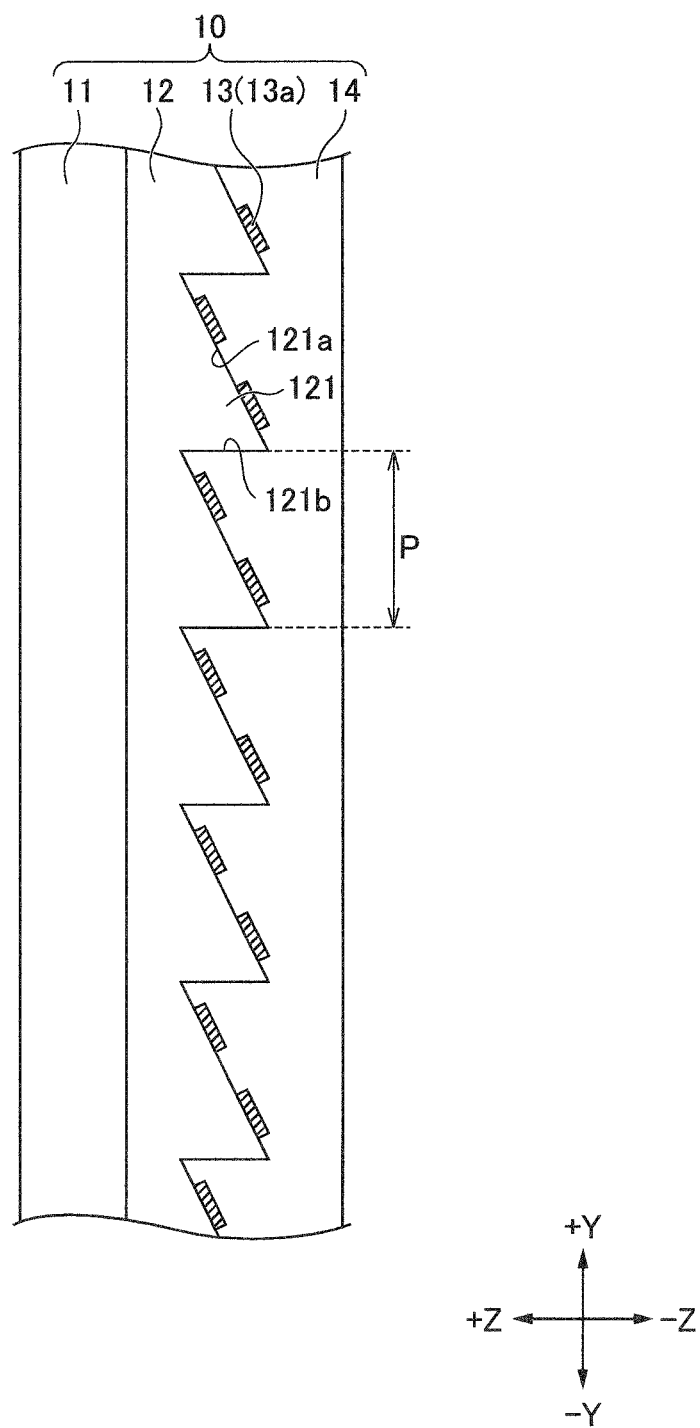
FIG. 15 is a view that illustrates an example of a layer structure of the screen 10 according to a fifth embodiment.
Figure 16:
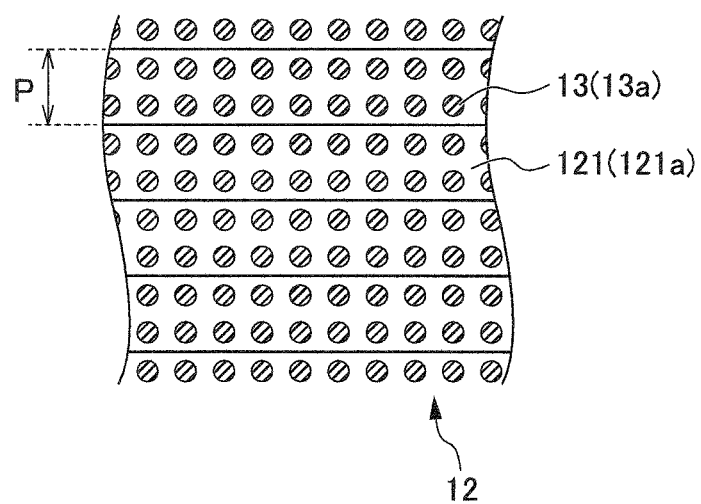
FIG. 16 is a view illustrating the reflective layer 13 according to the fifth embodiment.
Figure 17:
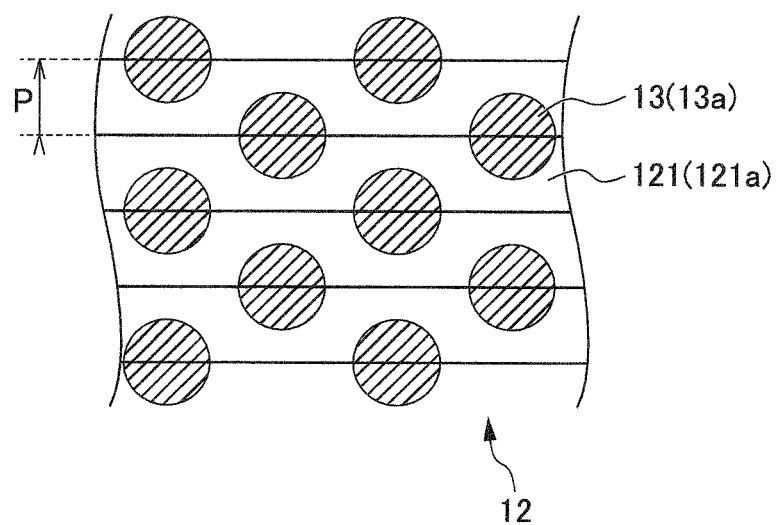
FIG. 17 is a view illustrating a different mode of the reflective layer 13 according to the fifth embodiment.

FIG. 15 is a view that illustrates an example of a layer structure of the screen 10 according to a fifth embodiment. FIG. 16 is a view illustrating the reflective layer 13 according to the fifth embodiment. FIG. 17 is a view illustrating a different mode of the reflective layer 13 according to the fifth embodiment. The configuration of the reflective layer 13 of the screen 10 according to the fifth embodiment differs to that in the first embodiment, but otherwise the screen 10 according to the fifth embodiment is similar to the screen 10 according to the first embodiment. Accordingly, other than the description of the reflective layer 13, the same reference symbols are applied to portions that achieve a similar function to that in the first embodiment described above, and duplicate descriptions are omitted, as appropriate.

The reflective layer 13 according to the fifth embodiment is formed by a plurality of island shapes on the first slope 121a, as illustrated in FIG. 16. Here, the plurality of island shapes refers to a state where a plurality of circles, ellipses, a polygon such as a rectangle, or any other shape are regularly or irregularly arranged on the first slope 121a. For the reflective layer 13 according to the present embodiment, a plurality of circular shaped reflective films 13a are regularly arranged along the first slope 121a. Portions on the first slope 121a where the reflective layer 13 (the plurality of circular shaped reflective films 13a) are not formed are optically transparent portions that transmit incident light.

Because the reflective layer of a transparent type screen described in the first embodiment or the like is provided on the entire surface of the first slope, adjustment of the reflectance and the transmittance can be performed by, for example, changing the material used in the case of a dielectric film. However, there are cases where it is not possible to sufficiently adjust the reflectance and the transmittance to desired values by simply changing the material. In contrast to this, with the screen 10 of the present embodiment, it is possible to adjust the reflectance and the transmittance of light incident on the screen 10 by adjusting the ratio of the area that the plurality of circular shaped reflective films 13a occupy with respect to the area of the first slope 121a. By this, it ceases to be necessary to make an adjustment such as changing the material of the dielectric film as described above, and it is possible to adjust the reflectance and the transmittance of the reflective layer with better efficiency.

Although FIG. 16 illustrates an example in which the diameter of each circular shaped reflective film 13a is smaller than the arrangement pitch P of the unit optical shapes 121 (width in the direction in which the first slope 121a are arranged) and the plurality of circular shaped reflective films 13a are formed on the first slope 121a, there is no limitation to this. For example, as illustrated in FIG. 17, configuration may be taken so as to have the diameter of each circular shaped reflective film 13a larger than the arrangement pitch P1 of the unit optical shapes 121 (width in direction in which the first slope 121a are arranged), and form the circular shaped reflective films 13a so that each circular shaped reflective film 13a spans adjacent first slopes 121a. Because the island shaped reflective films in the mode illustrated in FIG. 16 can respectively be formed smaller than those in the mode illustrated in FIG. 17, it is difficult for an observer to visually recognize the shape of the reflective films, and it is unlikely for moire to occur.

Although omitted in FIG. 15, in the screen 10 according to the fourth embodiment, fine and irregular uneven shapes are also formed on portions of the first slope 121a where the reflective layer 13 (the plurality of circular shaped reflective films 13a) are formed, and the reflective layer 13 is formed following these fine and irregular uneven shapes and is deposited in a state where these uneven shapes are maintained. Accordingly, the surface of the reflective layer 13 on the first optical shape layer 12 side (image source side) and the surface of the reflective layer 13 on the second optical shape layer 14 side (rear surface side) are rough surfaces that have a fine and irregular uneven shape. By this, the reflective layer 13 diffusely reflects some of the incident light in accordance with the fine uneven shape, and transmits, without diffusion, the remaining light that is not reflected. Here, the size of the island shaped reflective films 13a (the area in a plan view, the same applies hereinafter) is configured to be larger than the size of one protruding portion of the fine and irregular uneven shapes and larger than the size of one recessed portion of the fine and irregular uneven shapes. Accordingly, the island shaped reflective films 13a are configured to include a plurality of protruding portions and recessed portions. This size relationship is because, if hypothetically the island shaped reflective films 13a are smaller than the protruding portions and recessed portions, the variation in the distribution of the orientation of light reflected by the reflective films 13a will become large, and it will not be possible to sufficiently achieve a light deflection action in accordance with the first slope 121a, and it will not be possible to observe an appropriate image. This fine uneven shape is formed by protruding shapes and recessed shapes that are irregularly arranged two-dimensionally. The size, shape, height, and the like of the protruding shapes and the recessed shapes are irregular.

Similarly to the first embodiment, the reflective layer 13 may be any of three types: a configuration that uses metal, a configuration that uses a dielectric multilayer film, and a configuration that uses a single layer dielectric film. For the reflective layer 13, it is possible to use a metal film and a dielectric film by appropriately combining the metal film and the dielectric film in a single layer or multiple layers. For the reflective layer 13, although description was given for an example in which the plurality of circular shaped reflective films 13a are regularly arranged on the first slope 121a, there is no limitation to this, and the circular shaped reflective films 13a may be arranged irregularly, and reflective films having a shape other than a circular shape may be regularly or irregularly arranged. In the present embodiment, description was given for an example in which the reflective layer 13 is not provided on the second slope 121b because there is no direct contribution to reflection of image light toward the side where there is an observer, but there is no limitation to this, and the reflective layer 13 may be provided on the second slope 121b.

Similarly to the first embodiment, the second optical shape layer 14 is a layer that has optical transparency and is provided on the rear surface side (−Z side) of the first optical shape layer 12 and the reflective layer 13. As described above, the reflective layer 13 is configured by a plurality of island shapes (the circular shaped reflective films 13a), and at portions of the first slope 121a of the first optical shape layer 12 where the circular shaped reflective films 13a are not formed (optically transparent portions), the first optical shape layer 12 and the second optical shape layer 14 are in direct contact, so that it is possible to strengthen adhesion between the first optical shape layer 12 and the second optical shape layer 14.

Figure 18:
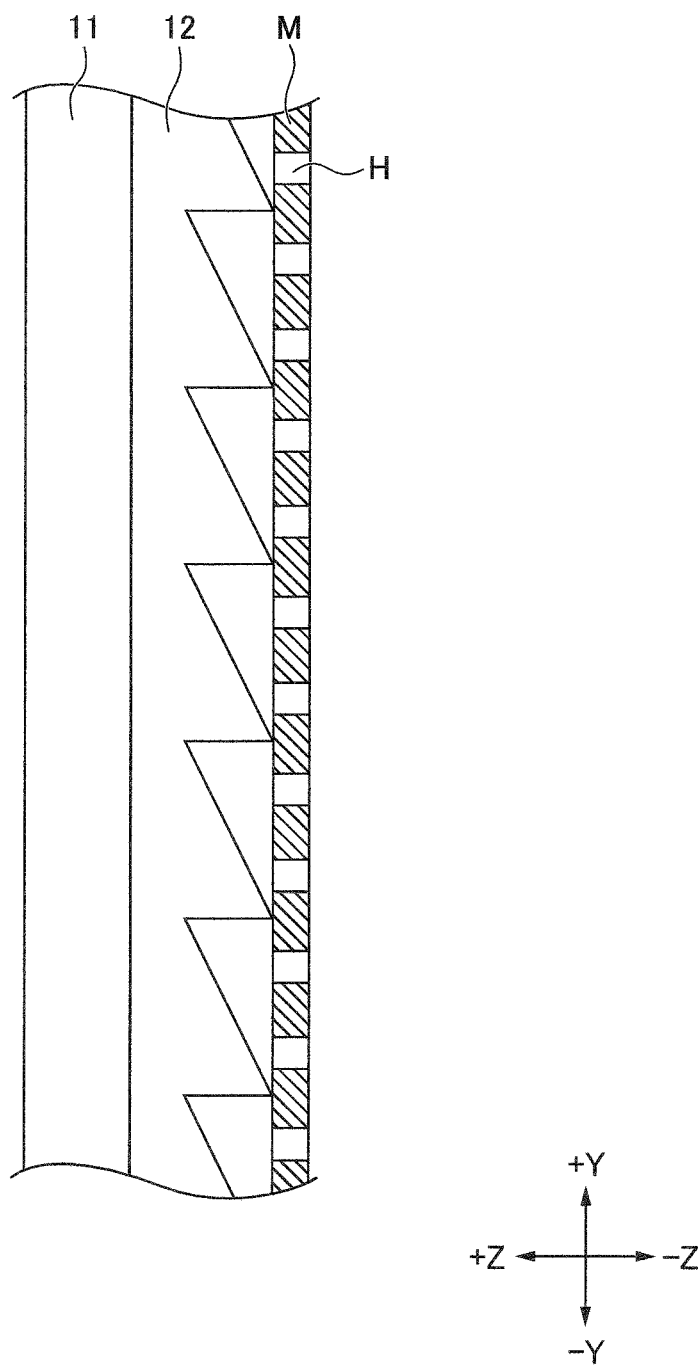
FIG. 18 is a view that illustrates an example of a method for manufacturing the reflective layer 13 according to the fifth embodiment.

The screen 10 according to the fifth embodiment is manufactured by a manufacturing method as follows, for example. FIG. 18 is a view that illustrates an example of a method for manufacturing the reflective layer 13 according to the fifth embodiment. Firstly, the base material layer 11 is prepared, and the first optical shape layer 12 is formed by a UV molding method in which one surface of the base material layer 11 is laminated with an UV curable resin in a state where the UV curable resin is filled in a shaping mold that shapes the unit optical shapes 121, and the resin is irradiated with ultraviolet rays to cure the resin. At this point, fine and irregular uneven shapes are formed on a shaping mold for shaping the unit optical shapes 121, on surfaces of the shaping mold for shaping the first slope 121a. The fine and irregular uneven shapes can be formed by performing a plating process, an etching process, a blasting process, or the like one or more times on the surface of the shaping mold for shaping the first slope 121a.

Subsequently, to prepare to form the reflective layer 13 next, as illustrated in FIG. 18, a mask M in which through holes H are provided at positions corresponding to the plurality of circular shaped reflective films 13a that configure the reflective layer 13 is laminated and arranged on the first optical shape layer 12. If a manufactured laminate that comprises the base material layer 11 and the first optical shape layer 12 is web-like, this laminate may be wound into a roll before a step for forming the reflective layer 13. In such a case, if the laminate is wound together with the mask M, it is possible to suppress contamination or damage to the first optical shape layer 12, and it is possible to prevent as much as possible a defect such as a vapor deposition defect for a reflective film from occurring in the subsequent step for forming the reflective layer 13.

Next, in a state where the mask M has been arranged on the unit optical shapes 121, by, for example, vapor depositing or sputtering a dielectric film, the reflective layer 13 (the plurality of circular shaped reflective films 13a) is formed on the first slope 121a with a predetermined thickness. In addition, the reflective layer 13 is not limited to this, and may be formed by, for example, vapor deposition of a metal having high light reflectivity such as aluminum, chromium (Cr), silver, or nickel, sputtering a metal having high light reflectivity, or transferring a metal foil. For example, if aluminum is used for the reflective layer 13, by having the film thickness sufficiently thick (greater than or equal to 0.1 μm), the reflectance of incident light becomes approximately 70 to 80%, and the absorptance of incident light becomes approximately 20%. In such a case, when the ratio of the first slope 121a that the area of the reflective layer 13 occupies is 20%, the reflectance due to the reflective layer 13 over the entire surface of the first slope 121a becomes 14 to 16% and the absorptance becomes approximately 4%, and it is possible to adjust the ratio of reflection and transmission of incident light while suppressing as much as possible the absorption of incident light at the reflective layer 13. In addition, by making the film thickness of the reflective layer 13 sufficiently thick, it is possible to prevent, for example, the occurrence of a mottled pattern due to fluctuation of the film thickness. By adjusting the film thickness, it is possible to adjust the reflectance (transmittance) of the reflective layer 13 in accordance with the metal material. Specifically, if the film thickness is made thinner the transmittance improves but the reflectance decreases, and if the film thickness is made thicker the reflectance improves but the transmittance decreases.

Next, from above the reflective layer 13, a UV curable resin is applied so as to fill the valley portions between the unit optical shapes 121 and achieve a planar shape, and the UV curable resin is cured by being irradiated with ultraviolet rays to form the second optical shape layer 14. By the above, the screen 10 is completed. Note that, because fine uneven shapes are formed as described above on the first slope 121a of the unit optical shapes 121, fine uneven shapes are formed on both surfaces of the reflective layer 13 formed on the first slope 121a. The uneven shape of the portions on the first slope 121a where the reflective layer 13 is not formed practically ceases to be conspicuous by being filled with the resin of the second optical shape layer 14, and, in the completed screen 10, portions of the first slope 121a where the reflective layer 13 is not formed can transmit incident light without diffusing it.

In the screen 10 according to the fifth embodiment as described above, the reflective layer 13, which is formed in a plurality of island shapes—in other words the plurality of circular shaped reflective films 13a, is formed at positions on the unit optical shapes 121 where the image light is incident (the first slope 121a). By this, the image light projected from the image source LS is reflected to the observer O1 side by the reflective layer 13, and some of the outside light such as the view on the rear surface side of the screen 10 is transmitted without diffusing through the reflective layer and portions on the unit optical shapes where the reflective layer is not formed (optically transparent portions), and exits on the observer O1 side. Accordingly, it is possible to display the image of the image source LS to the observer O1, and the view on the rear surface side of the screen 10 can be observed more clearly.

Sixth Embodiment

Figure 19:
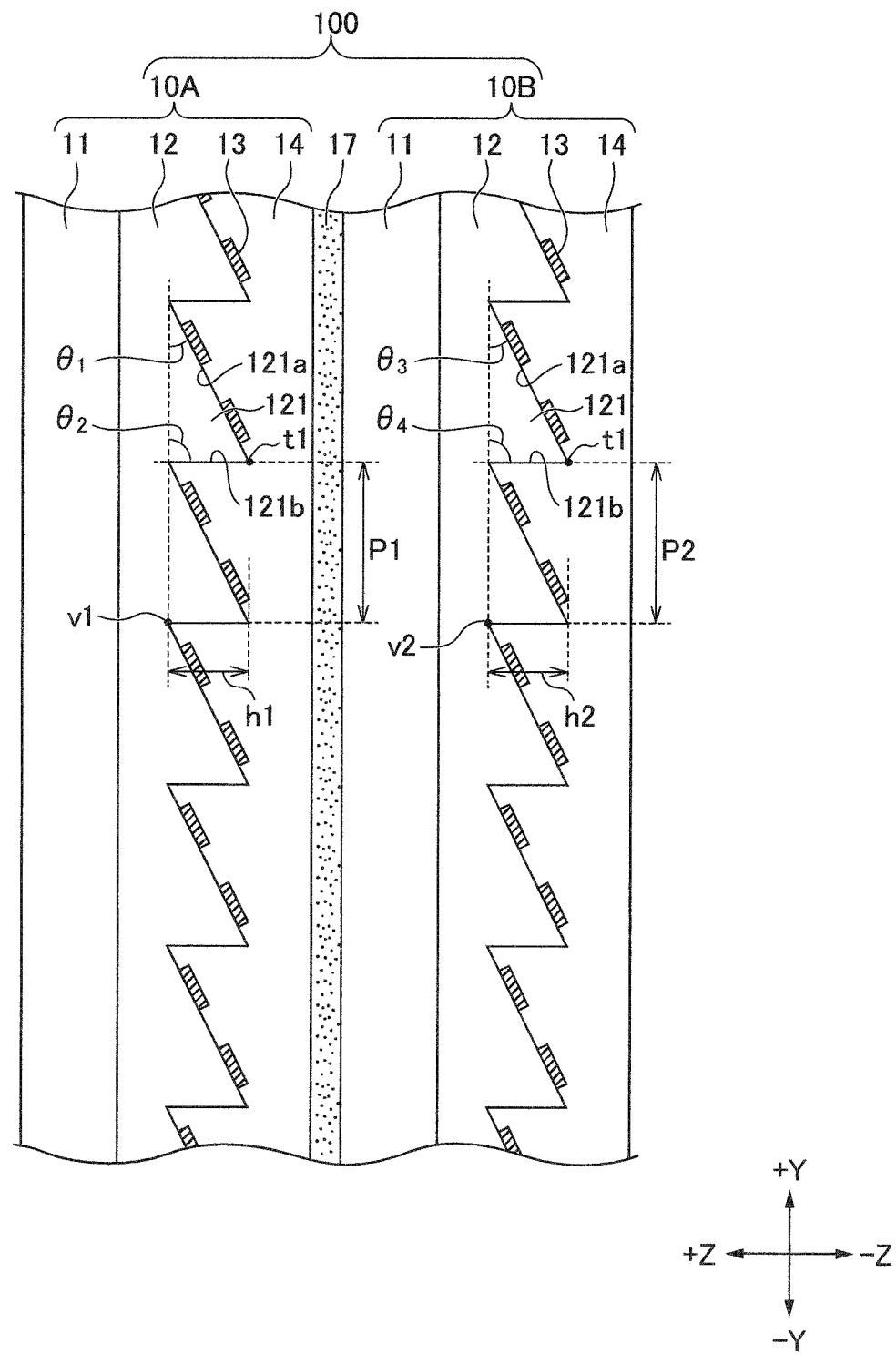
FIG. 19 is a view describing an example of a layer structure of a screen 100 according to a sixth embodiment.

FIG. 19 is a view describing an example of a layer structure of a screen 100 according to a sixth embodiment. FIG. 19 illustrates a cross-section that passes through the point A which is the center of the screen 100, and is parallel to the screen up/down direction (Y direction) and the thickness direction (Z direction). The screen 100 according to the sixth embodiment has two of the screens 10 according to the fifth embodiment (hereinafter referred to as a first screen portion 10A and a second screen portion 10B) bonded through a bonding layer 17, but otherwise has a similar mode to the screen 10 according to the fifth embodiment described above. Accordingly, the same reference symbols or reference symbols that are the same at the end are applied to portions that achieve a similar function to that in the first embodiment, and duplicate descriptions are omitted, as appropriate.

As illustrated in FIG. 19, the screen 100 according to the sixth embodiment is provided with the first screen portion 10A, and the second screen portion 10B, which is positioned on the rear surface side of the first screen portion 10A, and these are integrally bonded by the bonding layer 17. More specifically, the second optical shape layer 14 on the rear surface side of the first screen portion 10A and the base material layer 11 on the image source side of the second screen portion 10B are bonded by the bonding layer 17. The bonding layer 17 is formed by a pressure sensitive adhesive or an adhesive that has high optical transparency, and is provided between the first screen portion 10A and the second screen portion 10B in the thickness direction of the screen 100. The bonding layer 17 is integrally bonded with the first screen portion 10A and the second screen portion 10B. The first screen portion 10A and the second screen portion 10B of the screen 100 according to the present embodiment are bonded to each other so that their optical centers respectively match. The respective unit optical shapes of the first screen portion 10A and the second screen portion 10B are formed with the same shape. Accordingly, the focus positions (light-condensing points) of each screen portion roughly match.

A screen that has transparency has a tendency in that scintillation (speckling) is likely to occur when an image light with a high luminance is projected by an image source having a small projection pupil diameter, for example. However, with the screen 100 according to the present embodiment, because the first screen portion 10A and the second screen portion 10B display the same image in the same display region and light that displays the same image exits the screen 100 through two different light paths, scintillation (speckling) is reduced. Accordingly, it is possible to reduce image scintillation (speckling), and have the image display device 1 and the screen 100 that can display a good image brightly. In addition, the screen 100 according to the present embodiment achieves similar effects to the screen 10 according to the fifth embodiment described above.

First Different Mode of the Sixth Embodiment

Figure 20:
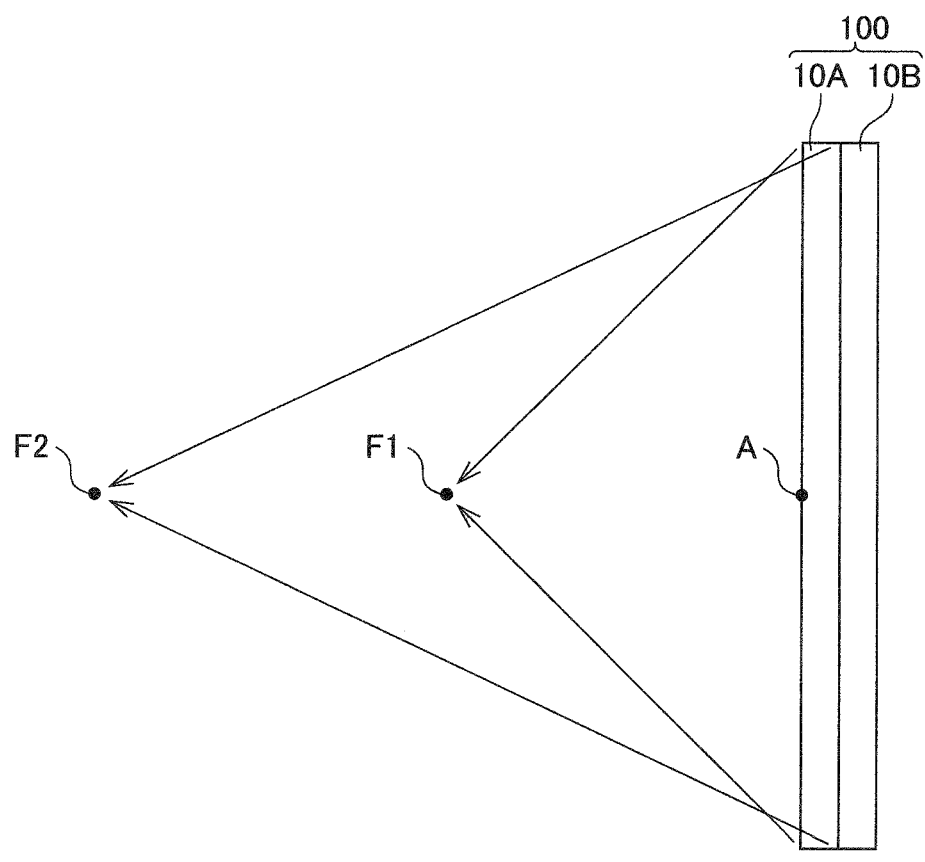
FIG. 20 is a view describing an example of a different mode of the screen 100 according to the sixth embodiment.

In the sixth embodiment described above, description was given for an example in which the focus positions (light-condensing points) of the first screen portion 10A and the second screen portion 10B roughly match, but there is no limitation to this, and a mode as follows may be used. FIG. 20 is a view illustrating an example of a different mode of the screen 100 according to the sixth embodiment. FIG. 20 is a view that illustrates the focus positions (light-condensing points) of the first screen portion 10A and the second screen portion 10B of the screen 100 according to a different mode. FIG. 20 illustrates a situation in which the screen 100 is viewed from the right side (+X side) in the screen left/right direction.

For the screen 100, the focus positions (light-condensing points) of the first screen portion 10A and the second screen portion 10B may differ in the thickness direction (Z direction). In the present embodiment, a light-condensing point F2 of the second screen portion 10B is positioned on a side further separated from the screen 100 (+Z side) than a light-condensing point F1 of the first screen portion 10A in the thickness direction (Z direction), as illustrated in FIG. 20. In other words, in the screen 100 according to the present embodiment, the circular Fresnel lens shape that the first optical shape layer 12 of the second screen portion 10B has, differs in shape and optical design to the circular Fresnel lens shape that the first optical shape layer 12 of the first screen portion 10A has, to give a design where there are different positions for the light-condensing points.

Accordingly, for example, the angles θ1 and θ2 of the first slope and the second slope for forming the unit optical shapes 121 of the first optical shape layer 12 of the second screen portion 10B are designed to correspond to the light-condensing point F2. Accordingly, the angle θ1 respectively differs between the unit optical shapes 121 of the first screen portion 10A and the unit optical shapes 121 of the second screen portion 10B, which are respectively positioned at points where a distance r from the optical center (C1) is equal.

In this mode, the value of an arrangement pitch P2 of the unit optical shapes 121 of the second screen portion 10B differs to the value of an arrangement pitch P1 of the unit optical shapes 121 of the first screen portion 10A, and the value of the arrangement pitch P2 is 1.4 times the value of the arrangement pitch P1, for example. In this way, by having the arrangement pitch P1 of the unit optical shapes 121 of the first screen portion 10A be different to the arrangement pitch P2 of the unit optical shapes 121 of the second screen portion 10B, it is possible to ameliorate moire due to interference between the image light of the image displayed by the first screen portion 10A and the image light of the image displayed by the second screen portion 10B. It is desirable to have the arrangement pitch of one of the screen portions be 1.4 times or 2.4 times the arrangement pitch of the other screen portions, in order to ameliorate moire. In this mode, description was given for an example where the arrangement pitch P1 and the arrangement pitch P2 have different values, but there is no limitation to this, and they may have the same value.

By having such a mode, it is possible to condense light for the same image which is displayed by the first screen portion 10A and the second screen portion 10B at different positions, and it is possible to display a good image to observers at different positions. Accordingly, by this different mode, in addition to the effect achieved by the sixth embodiment described above, it is also possible to condense the image light toward two different positions, and it is possible to display a good image to observers at two different positions.

In a case where the image light is condensed at two different positions as described above, it is desirable to have the full width at half maximum $\alpha_H$ with respect to the peak luminance be less than or equal to 20°, in the luminance distribution (viewing angle distribution) of light reflected by the first screen portion 10A and the second screen portion 10B. By this, it is possible to improve the ability to condense the image light, and display a clear, bright image to an observer positioned at a light-condensing point.

Second Different Mode of the Sixth Embodiment

Figure 21:
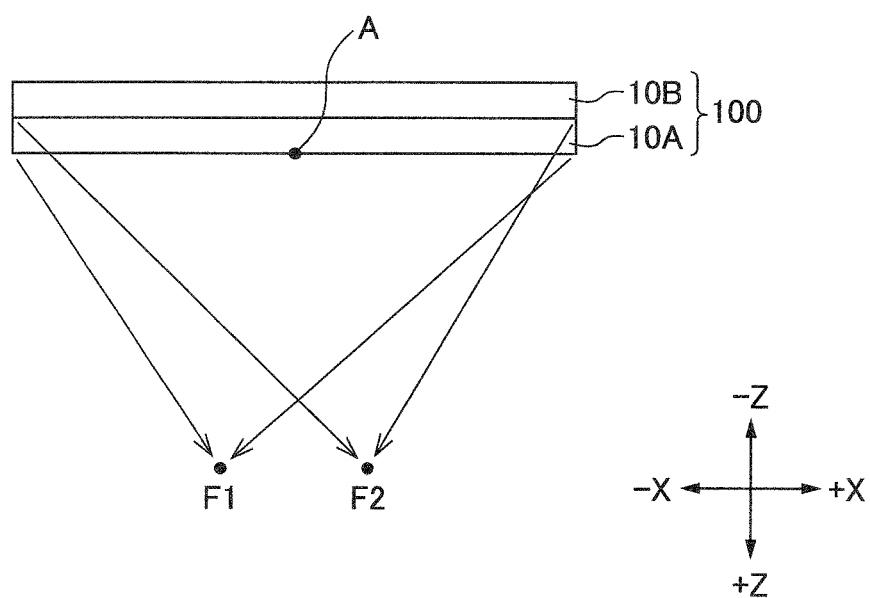
FIG. 21 is a view describing a second different mode of the screen 100 according to the sixth embodiment, and is a view in which the screen 100 is seen from the upper side in a screen up/down direction.

FIG. 21 is a view of describing a second different mode of the screen 100 according to the sixth embodiment, and is a view in which the screen 100 is seen from the upper side in a screen up/down direction. As illustrated in FIG. 21, the focus positions (light-condensing points) F1 and F2 of the first screen portion 10A and the second screen portion 10B may differ in the screen left/right direction (X direction). By having such a mode, it is possible to widen the viewing angle in the screen left/right direction. In addition, such a mode is desirable for, for example, a horizontally long screen for which the dimension in the screen left/right direction is longer than the dimension in the screen up/down direction.

Figure 22:
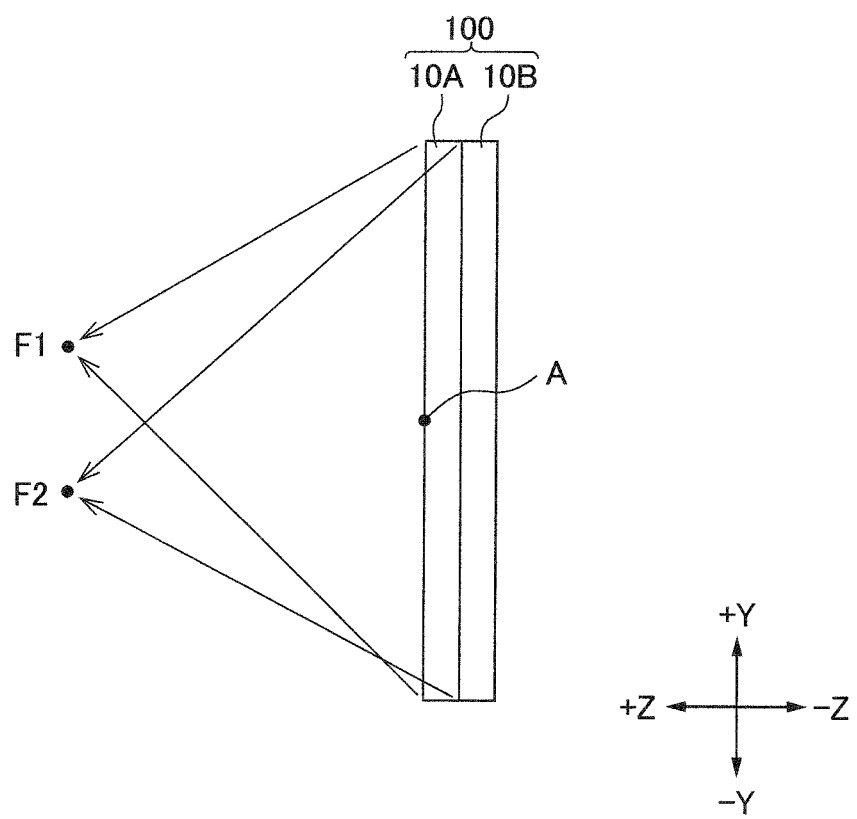
FIG. 22 is a view describing the second different mode of the screen 100 according to the sixth embodiment, and is a view in which the screen 100 is seen from the right side in a screen left/right direction.

FIG. 22 is a view of describing the second different mode of the screen 100 according to the sixth embodiment, and is a view in which the screen 100 is seen from the right side in a screen left/right direction. As illustrated in FIG. 22, the light-condensing point F1 of the first screen portion 10A and the light-condensing point F2 of the second screen portion 10B may differ in the screen up/down direction (Y direction). By having such a mode, it is possible to widen the viewing angle in the screen up/down direction. In addition, such a mode is desirable for, for example, a vertically long screen for which the dimension in the screen up/down direction is larger than the dimension in the screen left/right direction. In addition, the light-condensing points F1 and F2 may differ in the screen left/right direction (X direction) and the thickness direction (depth direction, Z direction), it may also differ in the screen up/down direction (Y direction) and the depth direction (Z direction), and may also differ in the screen up/down direction (Y direction) and the screen left/right direction (X direction). One of the light-condensing points F1 and F2 may be set to infinity.

In a case where the light-condensing points F1 and F2 differ as described above, the circular Fresnel lens shapes of the first optical shape layer 12 of the first screen portion 10A and the first optical shape layer 12 of the second screen portion 10B are designed in conjunction with this. Accordingly, the optical centers which are the Fresnel centers may or may not match when seen from the normal direction of the screen surface in accordance with the design.

For example, the first optical shape layer 12 of the first screen portion 10A and the first optical shape layer 12 of the second screen portion 10B may have the same circular Fresnel lens shape, but have different positions for corresponding Fresnel centers (optical centers) as seen from the normal direction of the screen surface. In addition, there may be a mode in which the first optical shape layer 12 of the first screen portion 10A and the first optical shape layer 12 of the second screen portion 10B have different circular Fresnel lens shapes, and also have different positions for the Fresnel centers (optical centers) of these shapes as seen from the normal direction of the screen surface. Furthermore, for example, there may be a mode in which the positions of the light-condensing points F1 and F2 match (or roughly match), but the angle distribution of the angle θ1 of the first slope of each screen portion and the positions of the optical centers differ. In the sixth embodiment, a mode in which two of the screens 10 according to the fifth embodiment (the first screen portion 10A and the second screen portion 10B) are bonded through the bonding layer 17 was exemplified, but a similar configuration in which a plurality of screens are provided may be achieved as a mode in which a plurality of reflective layers are provided in the thickness direction of the reflective screen with a predetermined interval opened therebetween, for example. Here, a laminate in which a plurality of reflective layers are independently spaced at predetermined intervals therebetween indicates provision of a plurality of independent reflective layers that each act as a reflective layer with respect to the image light and not a mode such as with a multilayer film reflective layer.

Seventh Embodiment

Figure 24:
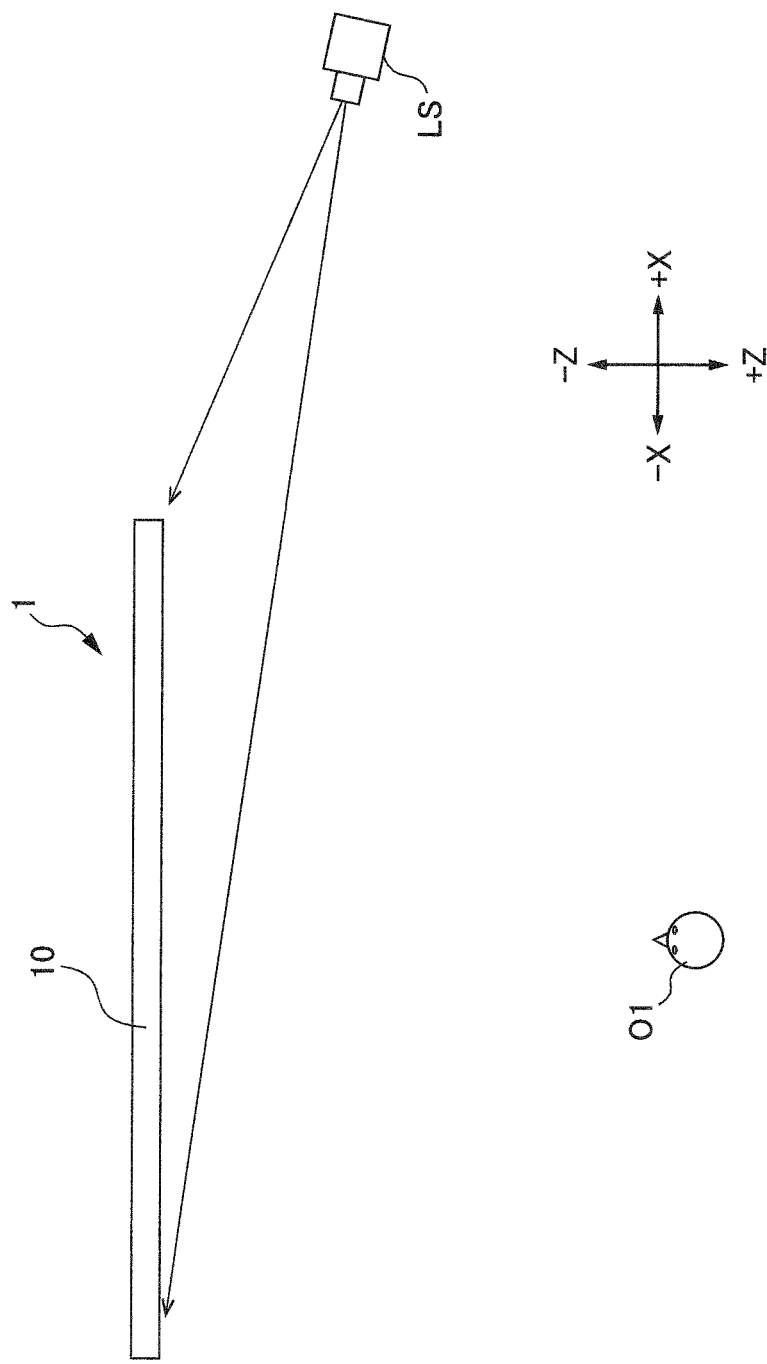
FIG. 24 is a view in which the image display device 1 according to the seventh embodiment is seen from the top surface.

FIG. 23 is a perspective view that illustrates the image display device 1 of a seventh embodiment. In FIG. 23, arc shapes corresponding to the circular Fresnel lens shape of the unit optical shapes 121 are also drawn on the surface of the screen 10, in order to facilitate understanding. FIG. 24 is a view in which the image display device 1 according to the seventh embodiment is seen from the top surface. The screen 10 according to the seventh embodiment appropriately employs configurations similar to that of embodiments described above. Accordingly, description of the specific mode of the screen 10 is omitted. The embodiments described above were described by exemplifying a mode in which the screen 10 is used with the direction in which the unit optical shapes 121 are arranged as the up/down direction. In the seventh embodiment, the screen 10 with the direction in which the unit optical shapes 121 are arranged as the left/right direction (horizontal direction) is used. Accordingly, in the seventh embodiment, the image source LS is arranged obliquely sideways with respect to the screen 10. In the screen 10, the light diffusing action in the direction in which the unit optical shapes 121 are arranged is greater than a light diffusing action in directions orthogonal to the arrangement direction. Accordingly, in the seventh embodiment, even if the position of the observer O1 deviates in the left/right direction, it is possible to enlarge the range in which it is possible to provide a good image.

Eighth Embodiment

Figure 25:
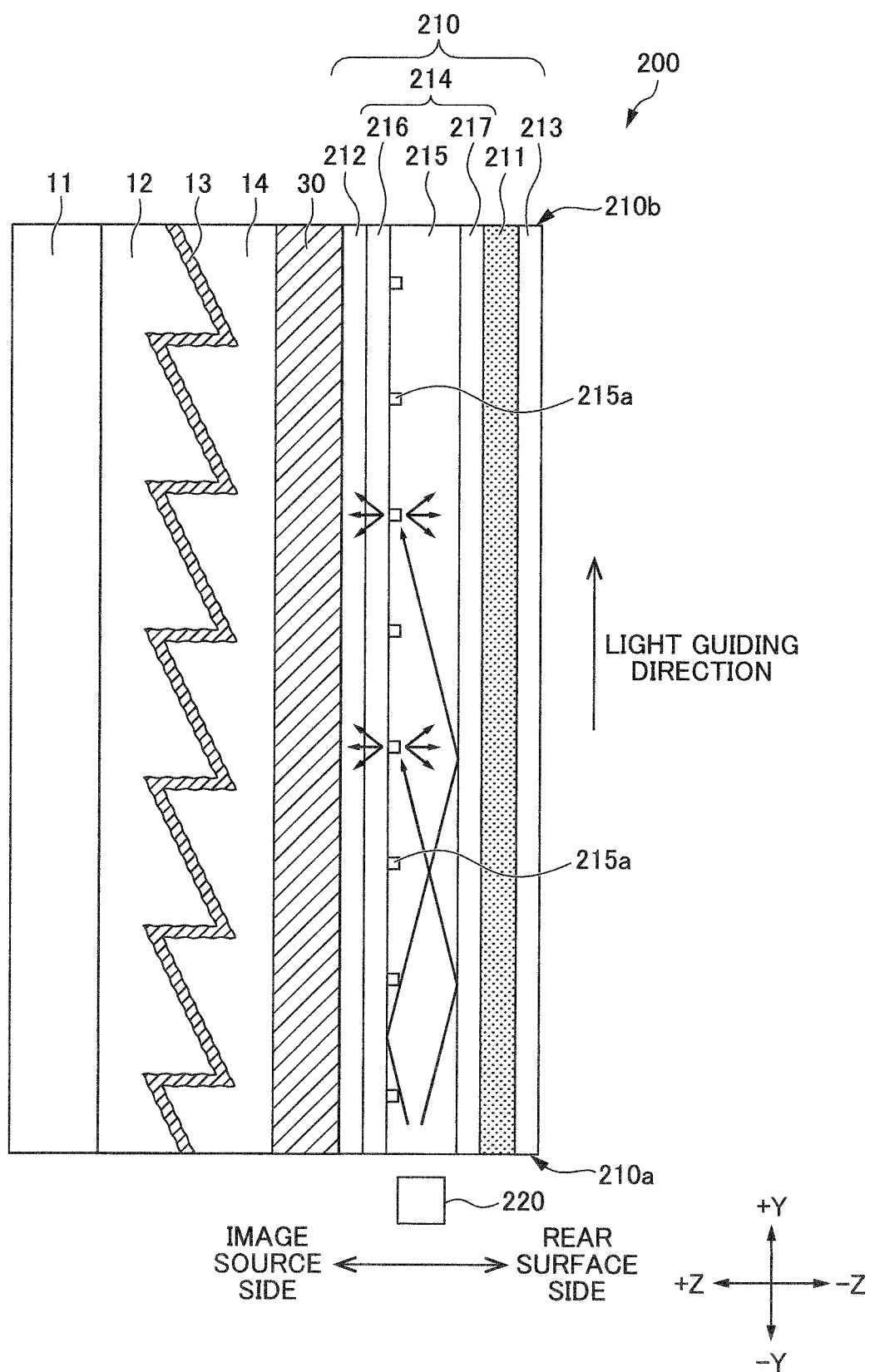
FIG. 25 is a view that illustrates an example of a layer structure of the screen 10 of an eighth embodiment.

FIG. 25 is a view that illustrates an example of a layer structure of the screen 10 of an eighth embodiment. The screen 10 according to the eighth embodiment has a mode in which the light control layer 40 in the third embodiment is made to be an improved light control layer 210. Other than providing the light control layer 210 and an excitation light source 220, the configuration of the screen 10 is similar to the screen 10 according to the third embodiment. Accordingly, the same reference symbols are applied to portions that achieve a similar function to that in the third embodiment described above, and duplicate descriptions are omitted, as appropriate.

The light control layer 210 and the excitation light source 220 configure a light control unit 200. The light control unit 200 has a configuration that enables the transmittance of a photochromic layer 211 to be adjusted by the excitation light source 220 controlled by a control unit (not illustrated). The light control layer 210 is provided with the photochromic layer 211, a first blocking layer 212, a second blocking layer 213, and a light guiding layer 214.

The photochromic layer 211 is a layer that is provided with photoresponsiveness, where the transmittance changes when the layer receives excitation light of a specific wavelength range. The photochromic layer 211 according to the present embodiment normally has a high transmittance for visible light and is substantially transparent to visible light. Upon receiving ultraviolet light, the photochromic layer 211 according to the present embodiment changes color to gray or black to thereby enter a state where there is reduced transmittance for visible light. For the photochromic layer 211 that has received ultraviolet light, when the reception of ultraviolet light ends, the transmittance for visible light gradually improves and the photochromic layer 211 returns to a transparent state. The photochromic layer 211 is configured from a resin that comprises a photochromic material (photosensitive substance). For example, a diarylethene compound, a spiropyran compound, a spiroperimidine compound, a flugide compound, a hexaarylbiimidazole compound, a naftpyran compound, or the like may be used as the photochromic material, but there is no limitation to this, and it is possible to appropriately use a conventionally known photochromic material.

The photochromic layer 211 according to the present embodiment has a maximum transmittance with respect to visible light that is orthogonally incident of 80% with respect to wavelengths of 430 nm to 700 nm in a state where the photochromic layer 211 has not changed color due to ultraviolet light, and a minimum transmittance of 20% with respect to wavelengths of 430 nm to 700 nm in a state where the photochromic layer 211 has changed color to the darkest color due to ultraviolet light.

The first blocking layer 212 is arranged on the image source side of the photochromic layer 211, and blocks the transmittance of ultraviolet light which is excitation light. More specifically, the first blocking layer 212 may be configured as a UV absorption layer and may be configured as a UV reflective layer. The first blocking layer 212 transmits (has a sufficiently high transmittance for) light in bands other than ultraviolet light which is blocked, and thus is substantially transparent with respect to visible light. In the present embodiment, the first blocking layer 212 is arranged on the surface of the light control layer 210 most on the image source side (positioned in contact with the adhesion layer 30).

The second blocking layer 213 is arranged on the rear surface side of the photochromic layer 211, and blocks the transmittance of ultraviolet light which is excitation light. More specific, the second blocking layer 213 may be configured as a UV absorption layer and may be configured as a UV reflective layer. The second blocking layer 213 transmits (has a sufficiently high transmittance for) light in bands other than ultraviolet light which is blocked, and thus is substantially transparent with respect to visible light. In the present embodiment, the second blocking layer 213 is arranged on the surface of the light control layer 210 most on the rear surface side.

In the present embodiment, the first blocking layer 212 and the second blocking layer 213 have the same configuration, are configured as UV absorption layers, and block (absorb) 90% or more of ultraviolet light having wavelengths of 280 nm to 380 nm that is orthogonally incident.

More desirably, it is preferable if the first blocking layer 212 and the second blocking layer 213 block (absorb) 95% or more of ultraviolet light having wavelengths of 280 nm to 380 nm that is orthogonally incident.

By having a configuration in which the photochromic layer 211 is sandwiched between the first blocking layer 212 and the second blocking layer 213, ultraviolet light that reaches the image source side and rear surface side of the light control layer 210 is mostly blocked by the first blocking layer 212 and the second blocking layer 213, and does not reach the photochromic layer 211. Accordingly, a change in the transmittance of the photochromic layer 211 due to foreign light or the image light does not occur.

The light guiding layer 214 is arranged between the first blocking layer 212 and the second blocking layer 213, and guides light incident from an end of the light control layer 210 so that at least some light exits on the photochromic layer 211 side. In the present embodiment, the light guiding layer 214 is arranged closer to the image source side than the photochromic layer 211. The light guiding layer 214 has a high refractive index layer 215, a first low refractive index layer 216, and a second low refractive index layer 217.

The high refractive index layer 215 is a region into which the excitation light is guided (ultraviolet light in the present embodiment), and has a higher refractive index than the refractive indexes of the first low refractive index layer 216 and the second low refractive index layer 217. It is desirable to form the high refractive index layer 215 using a material having a high transmittance with respect to visible light and ultraviolet light which is the excitation light. The first low refractive index layer 216 is arranged adjacent to the high refractive index layer 215 on the image source side, and has a lower refractive index than the refractive index of the high refractive index layer 215. The second low refractive index layer 217 is arranged adjacent to the high refractive index layer 215 on the rear surface side, and has a lower refractive index than the refractive index of the high refractive index layer 215. It is desirable if both of the first low refractive index layer 216 and the second low refractive index layer 217 are formed using a material having high transmittance with respect to visible light and ultraviolet light, which is the excitation light. In the present embodiment, the first low refractive index layer 216 and the second low refractive index layer 217 are configured by the same material. By the light guiding layer 214 having a configuration such as that described above, in other words the configuration in which the high refractive index layer 215 is sandwiched between the first low refractive index layer 216 and the second low refractive index layer 217, the light guiding layer 214 totally reflects excitation light from the excitation light source 220 that arrives at the interface between the high refractive index layer 215 and the first low refractive index layer 216 and the interface between the high refractive index layer 215 and second low refractive index layer 217 at an angle greater than a critical angle. By this, the excitation light is guided in a light guiding direction (a direction from downward to upward in FIG. 25).

The light guiding layer 214 is also provided with path change portions 215a that change the direction in which some of the guided light proceeds. Each path change portion 215a in the present embodiment is configured as a groove shape provided on the image source side of the high refractive index layer 215. Each path change portion 215a extends in a direction orthogonal to the light guiding direction, in other words in the screen left/right direction, maintaining the same groove shape. A plurality of the path change portions 215a are arranged along the light guiding direction with intervals open therebetween. The cross-sectional shape of the path change portions 215a according to the present embodiment is illustrated as a rectangular shape in FIG. 25, but may be a triangular shape, and the cross-sectional shape may be appropriately changed to a semicircular shape, part of an oval shape, or the like. The inside of the groove shape of the path change portions 215a for example may be filled by the resin that forms the first low refractive index layer 216, and may be filled by another resin. However, if the inside of the groove shapes of the path change portions 215a are left as gaps, there is a risk that condensation as, for example, dewdrops may occur in the gaps and it will be easier to visually recognize the path change portions 215a, and thus it is desirable to fill the insides with some type of resin.

The excitation light source 220 is arranged at an end portion 210a of the light control layer 210, emits ultraviolet light which is to be the excitation light, and irradiates the excitation light onto the end portion 210a. The excitation light irradiated on the end portion 210a is incident from the end portion 210a into the high refractive index layer 215, and proceeds in the light guiding direction. In the present embodiment, for the excitation light source 220, a plurality of LED (light emitting diodes) light sources which are point light sources are arranged.

Regarding the end portion 210a, although not illustrated, it is desirable to arrange a light-blocking film, a light-blocking member, or the like at the end portions of other layers beside the end portion of the high refractive index layer 215 and particularly at the end portion of the photochromic layer 211, so that the excitation light is not directly incident thereon. At the end portion 210b on the side that faces the end portion 210a and at the end portions of the light control layer 210 on the left and right of the screen that extend along the light guiding direction, for example a UV-reflective material that reflects the excitation light may be arranged so as to return the excitation light, or a UV-absorbent material that absorbs the excitation light may be arranged.

When the excitation light source 220 emits light, the excitation light is incident from the end portion 210a, and proceeds in the direction indicated by the arrow in FIG. 25. As described above, the excitation light that proceeds within the high refractive index layer 215 is totally reflected, at an angle larger than the critical angle, upon reaching the interface between the high refractive index layer 215 and the first low refractive index layer 216, and the interface between the high refractive index layer 215 and the second low refractive index layer 217. By repeating this, the excitation light is guided in the light guiding direction. The direction in which excitation light that reaches the path change portions 215a proceeds is greatly changed. There are various directions in which excitation light, which is changed by the path change portions 215a, proceeds, but some of this light is incident on the interface between the high refractive index layer 215 and the second low refractive index layer 217 at an angle smaller than the critical angle. This excitation light exits from the light guiding layer 214 through this interface, and reaches the photochromic layer 211 to thereby reduce the transmittance of the photochromic layer 211.

As described above, the path change portions 215a change the path of excitation light so that some of the excitation light proceeds to the photochromic layer 211. Accordingly, the distribution of excitation light toward the photochromic layer 211 changes in accordance with the level of excitation light that hits the path change portions 215a. It is desirable to appropriately optimize the arrangement of the path change portions 215a in order to make the transmittance uniform across the entirety of the photochromic layer 211. Because the light guiding layer 214 can be regarded as a surface light source for excitation light, it is possible to use, as appropriate, a configuration similar to a conventionally known surface light source device as the specific configuration of the path change portions 215a. For example, light diffusing particles may be included in the light guiding layer 14 in place of the path change portions 215a.

With the mode of the path change portions 215a as in the present embodiment, it is possible to make the distribution of the amount of exiting excitation light uniform by changing the depth of the grooves for the path change portions 215a in accordance with their respective location. Specifically, it is sufficient to have the depth of a groove of a path change portion 215a on the side closer to the excitation light source 220 smaller than the depth of a groove of a path change portion 215a on the side further from the excitation light source 220. The depth of the grooves of the plurality of path change portions 215a may change in units of one path change portion 215a along the light guiding direction, and may change gradually in units of a plurality of path change portions 215a at a time along the light guiding direction. It is also possible to make the distribution of the amount of exiting excitation light uniform by changing the width (width in the light guiding direction) and the arrangement pitch of the path change portions 215a. However, it is desirable to have the width and the arrangement pitch of the path change portions 215a be constant. This is to prevent the path change portions 215a from being visually recognized.

When the excitation light source 220 emits excitation light, the transmittance of the photochromic layer 211 decreases, and it is possible to exhibit a so-called light control action. Because the decrease of the transmittance of the photochromic layer 211 is approximately simultaneous with the emission of excitation light by the excitation light source 220, there is a fast response speed for the change in the transmittance. Because the photochromic layer 211 has a maximum transmittance of 80% and a minimum transmittance of 20% as described above, in comparison to a light control layer that uses liquid crystals or the like, the photochromic layer 211 has a better dynamic range for transmittance, produces a greater difference between during the transmission and during the light control (when decreasing the transmittance), and has a higher utility value. The light control layer 210 has a configuration in which the photochromic layer 211 is sandwiched between the first blocking layer 212 and the second blocking layer 213. Accordingly, a change in the transmittance of the photochromic layer 211 due to foreign light or the image light does not occur. It is also possible to prevent the excitation light from exiting from the light control layer 210.

In the eighth embodiment described above, only the excitation light source 220 is provided, but, for example, a light source that emits light that has an action for improving the transmittance of the photochromic layer 211 (for example, visible light) so that the light is incident on the light guiding layer 14 may also be provided.

Modifications

There is no limitation to the embodiments described above, and various modifications and changes are possible within the scope of the present invention.

(1) In each embodiment, description was made by giving an example where the first slope 121a (first surface) and the second slope 121b (second surface) are straight lines in cross-section (the first slope and the second slope are planes), and the connection surface 121c is a curve. There is no limitation to this, and for example, the first slope (first surface) may also be a curve in cross-section—in other words the first slope (first surface) may be made to be a curved surface, and the second slope (second surface) may be a curve in cross-section—in other words the second slope (second surface) may be made to be a curved surface.

(2) In each embodiment, a hard coat layer for the purpose of scratch prevention may be provided on the front surface or the back surface of the screen 10. The hard coat layer is formed by, for example, applying a UV curable resin having a hard coat function (for example, a urethane acrylate) on the surfaces of the screen 10. There is no limitation to a hard coat layer, and in accordance with the purpose of use or the usage environment of the screen 10, one or a plurality of layers having appropriately necessary functions such as an anti-reflective function, an ultraviolet light absorption function, a stain resistant function, or an anti-static function may be selected and provided on the screen 10, for example. A touch panel layer or the like may also be provided on the image source side of the base material layer 11. In particular, in a case where an anti-reflective layer is provided on the surface of the screen 10 on the image source side, it is possible to prevent image light reflected by the reflective layer 13 from being reflected by the interface with air on the image source side and exiting on the rear surface side to be displayed as though the image has leaked on the rear surface side.

(3) Description was given in the sixth embodiment of an example in which screens 10 according to the fifth embodiment (the first screen portion 10A and the second screen portion 10B) are overlappingly arranged. There is no limitation to this, and, for example, screens 10 according to the first embodiment may be arranged in an overlapping manner.

(4) In the embodiments, description was given for examples in which the size, shape, arrangement, and the like of the fine uneven shapes on the surface of the reflective layer 13 (the surface of the unit optical shapes 121) are irregular, but any of the size, shape, and arrangement may have regularity.

(5) In the embodiments, description was given for an example in which the image source LS is positioned at the center of the screen 10 in the screen left/right direction and downward on the outside of the screen, but there is no limitation to this. For example, there may be a mode in which the image source LS is arranged on a side obliquely downward from the screen 10 and projects the image light from an oblique direction in the screen left/right direction onto the screen 10. In this case, the mode is such that the direction in which the unit optical shapes 121 are arranged is tilted in alignment with the position of the image source LS. By having such a mode, it is possible to freely set, for example, the position of image source LS.

(6) In the embodiments, description was given for an example in which fine and irregular uneven shapes are formed on the first slope 121a, the second slope 121b, and the connection surface 121c, but there is no limitation to this. For example, there may be a mode in which the fine and irregular uneven shapes are formed only on the first slope 121a. In addition, description was given for an example in which the reflective layer 13 is formed on the entire surface of the unit optical shapes 121, but there is no limitation to this. For example, there may be a mode in which the reflective layer 13 is formed on at least part of the first slope 121a.

(7) In the embodiments, description was mainly given for an example in which the image display device 1 is arranged on a partition for indoor use, and description was given for an example in which the image display device 1 was arranged on the window of an automobile in the second embodiment and the third embodiment. There is no limitation to these, and, for example, each of the embodiments may be applied to image display such as at an exhibition or to, for example, a display window for a store or the like, and may be applied to, for example, a window (front window, side window, rear window, or the like) of various vehicles (for example, an aircraft, a railway vehicle, a ship, or the like) without being limited to an automobile.

(8) In the second embodiment, description was given for an example in which the light control layer 20 uses liquid crystals. There is no limitation to this. For example, as something that does not use liquid crystals, the light control layer may be a device for which light/dark (transmittance) changes in accordance with a difference in potential between electrodes, such as with an EC method, an SPD method, or a PDLC method light control film. A light control film that uses the EC (electro chromic) method has a structure in which a light control layer (electrolyte layer) is sandwiched between a pair of electrodes. The color of the light control layer changes between transparent and navy blue by using a redox reaction, in accordance with the difference in potential between the electrodes. A light control film that uses the SPD (suspended particle device) method uses the orientation of fine particles and is normally colored navy blue, but changes to transparent when a voltage is applied and returns to the original navy-blue color when the voltage is cut. The tint can be adjusted in accordance with the voltage. A light control film that uses the PDLC (polymer dispersed liquid crystal) method is where a network structure made up of special polymers is formed in a liquid crystal layer, and the action of the polymer network induces an irregular state for the arrangement of the liquid crystal molecules, and causes light to be scattered. By applying a voltage, the liquid crystal molecules align in the electric field direction, and enter a transparent state where light is not scattered.

(9) In the embodiments, description was given for an example in which the unit optical shapes 121 of the screen 10 are formed in a circular Fresnel lens shape, but there is no limitation to this, and the unit optical shapes 121 may be formed in a linear Fresnel lens shape. Description was also given for an example in which the optical center of the circular Fresnel lens shape is arranged outside of the surface region of the screen 10, but there is no limitation to this, and the optical center may be arranged inside of the surface region of the screen 10.

(10) In the sixth embodiment, description was given of an example in which the display region of the first screen portion 10A and the display region of the second screen portion 10B match the screen 10 (display region) seen from in front of the screen 100, but there is no limitation to this. For example, there may be a mode in which the display region of the first screen portion 10A and the display region of the second screen portion 10B partially overlap, and the area of the region where the display regions overlap is larger than 50% of the area of the screen 10 (display region), seen from in front (in the Z direction, the normal direction of the screen surface) of the screen 100. Even with this mode, it is possible to expect scintillation to be ameliorated. From the perspective of reducing scintillation from an image dis-played on the screen 10 in order to display a good image, it is desirable for the region where the display region of the first screen portion and the display region of the second screen portion overlap to be 90% or more of the area of the screen 100 (display region).

(11) In the sixth embodiment, description was given for an example in which two of the screens 10 are laminated together, but there is no limitation to this, and three or more of the screens 10 may be laminated together. The light-condensing points of the three or more screens may match one another, and may be different to one another.

(12) In the embodiments, description was given for an example in which, for the image display device 1, the image source LS is a projector and the screen 10 has the reflective layer 13 which diffusely reflects incident light, but there is no limitation to this, and there may be a mode in which the image source is a micro display that uses an LCD (a liquid-crystal display), and the screen is a so-called HUD (head-up display) configured from a reflective layer that specularly reflects incident light.

(13) In the first embodiment, description was given for an example in which light diffusing action in the direction in which the unit optical shapes 121 are arranged in accordance with the shape of the unit optical shapes 121 is larger than the light diffusing action in directions orthogonal to the arrangement direction. There is no limitation to this, and, for example, by causing the fine uneven shapes formed in the surface of the unit optical shapes 121 to have regularity and anisotropy, anisotropy may be granted to the light diffusing action, and the reflective surface may be caused to be curved when applying the unevenness.

Figure 26:
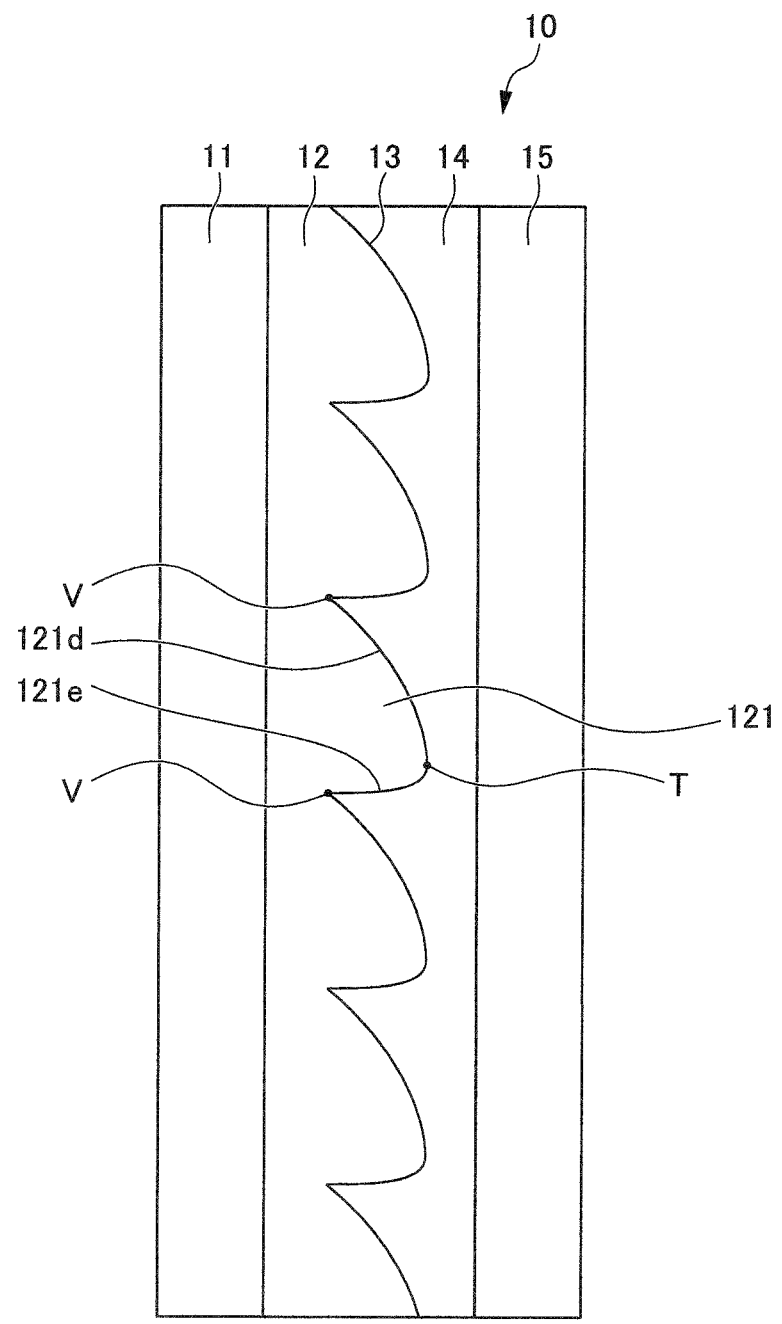
FIG. 26 is a view that illustrates an example of a modification of unit optical shapes 121.

(14) In the modification of the first embodiment, description was given for an example in which the shape of each unit optical shape 121 has a continuous curved surface at the valley bottom portion V and has a discontinuous curved surface at the vertices T, as illustrated in FIG. 8. There is no limitation to this, and it is possible to employ various modifications for the shape of the unit optical shapes 121. FIG. 26 is a view that illustrates an example of a modification of the unit optical shapes 121. As illustrated in FIG. 26, there may be a mode in which the curved surface is continuous at the vertex T and the curved surface is discontinuous at valley bottom portions V. Although no illustration is made, there may be a mode in which the curved surface is continuous at both of the vertex T and the valley bottom portions V. The orientation of the curved surface may be protrusions with respect to the observer side as illustrated in FIG. 8, and may be recesses with respect to the observer side as illustrated in FIG. 26.

The embodiments and modifications can be suitably combined and used, but detailed description thereof is omitted. In addition, the present invention is not limited by the embodiments described above.

EXPLANATION OF REFERENCE NUMERALS

1 Image display device
2 Front window
3 Interior panel
4 Steering wheel
10 Screen
10A First screen portion
10B Second screen portion
11 Base material layer
12 First optical shape layer
13 Reflective layer
13a Reflective film 14 Second optical shape layer
15 Protective layer
17 Bonding layer
20 Light control layer
20A First laminate for liquid crystals
20B Second laminate for liquid crystals
21A, 21B Base material
22A, 22B Transparent electrode
23A, 23B Orientation layer
24 Bead spacer
25 Sealing material
26, 27 Liquid crystal layer
28 Spacer
29A, 29B Linear polarizing plate
30 Adhesion layer
40 Light control layer
50 Support plate
60 Light absorption layer
51 Bonding layer
61 First glass plate
62 First intermediate layer
63 Second intermediate layer
64 Second glass plate
100 Screen
121 Unit optical shape
121a First slope
121b Second slope
121c Connection surface
200 Light control unit
210 Light control layer
210a, 210b End portion
211 Photochromic layer
212 First blocking layer
213 Second blocking layer
214 Light guiding layer
215 High refractive index layer
215a Path change portion
216 First low refractive index layer
217 Second low refractive index layer
220 Excitation light source

The invention claimed is:

1. A reflective screen that displays an image by reflecting some image light projected from an image source, the reflective screen comprising:
an optical shape layer that has optical transparency and a plurality of unit optical shapes arranged in an arrangement direction on a rear surface side; and
reflective layer portions provided on at least part of each unit optical shape, to reflect some incident light and transmit at least some remaining incident light,
wherein each unit optical shape has, in a cross-sectional shape cut in the arrangement direction, acute-angled vertices that protrude the most on the rear surface side, and a curved valley bottom portion that is depressed the most on an image source side, or curved vertices that protrude the most on the rear surface side and an acute-angled valley bottom portion that is depressed the most on the image source side.

2. The reflective screen according to claim 1, wherein a light diffusing action in the arrangement direction of the unit optical shapes is greater than a light diffusing action in directions orthogonal to the arrangement direction.

3. The reflective screen according to claim 1, wherein in a case of measuring an angular luminance distribution in a situation where the image light is projected under a condition where the front of the center of a screen has a maximum luminance, a half-value angle in the arrangement direction of the unit optical shapes is greater than a half-value angle in a direction orthogonal to the arrangement direction by 5% or more.

4. The reflective screen according to claim 1, wherein the optical shape layer has a first surface onto which the image light is incident, a second surface that faces the first surface, and a connection surface configured by a curved surface that connects the first surface and the second surface.

5. The reflective screen according to claim 1, wherein the optical shape layer has a first surface on a side that has a wider width, and a second surface on a side that faces the first surface, and
wherein at least the first surface has a curved cross-sectional shape, cut in the arrangement direction.

6. The reflective screen according to claim 1, wherein a surface of the reflective layer on at least the image source side is a rough surface and diffusely reflects some of the incident light.

7. The reflective screen according to claim 6, wherein the surface of the unit optical shapes has a fine uneven shape,
wherein the uneven shape is a shape for which a light diffusion effect in the direction in which the unit optical shapes are arranged is greater than a light diffusion effect in the directions orthogonal to the direction in which the unit optical shapes are arranged, and
wherein at least the surface of the reflective layer on the unit optical shapes side has an uneven shape that corresponds to the uneven shape of the unit optical shapes.

8. The reflective screen according to claim 6, wherein the surface of the unit optical shapes has a fine and irregular uneven shape, and
wherein at least the surface of the reflective layer on the unit optical shapes side has an uneven shape that corresponds to the uneven shape of the unit optical shapes.

9. The reflective screen according to claim 1, wherein 5°≤αV≤45° is satisfied, and
wherein αV is the average of the absolute values of +αV1 and −αV2, wherein +αV1 and −αV2 are respectively amounts of angle change from an exit angle at which the reflected light from the reflective screen has a peak luminance to exit angles at which the luminance becomes ½ in the direction in which the unit optical shapes are arranged.

10. The reflective screen according to claim 1, wherein in the arrangement direction of the unit optical shapes, when amounts of angle change from an exit angle where the reflected light from the reflective screen has a peak luminance until exit angles at which the luminance becomes ½ are respectively set to +αV1 and −αV2,
wherein an average of absolute values of +αV1 and −αV2 is set to αV, and
wherein an angle that the first surface forms with a plane parallel to the screen surface is set to θ1, a relationship αV<arcsin(n×sin(2×(θ1))) is satisfied in at least some regions of the reflective screen.

11. The reflective screen according to claim 1, further comprising:
a light absorption layer provided closer to the rear surface side than the reflective layer in a thickness direction of the reflective screen.

12. The reflective screen according to claim 1, further comprising:
a light control layer that enables the transmittance of the light control layer to be changed, and which is provided closer to the rear surface side than the reflective layer in a thickness direction of the reflective screen.

13. The reflective screen according to claim 12, wherein the light control layer has a first transparent electrode, a second transparent electrode arranged facing the first electrode, and a light control material arranged between the first electrode and the second electrode, and which enables the transmittance of the light control material to be changed in accordance with a difference in potential between the first electrode and the second electrode.

14. The reflective screen according to claim 13, wherein the light control material is liquid crystals that have a dichroic pigment.

15. The reflective screen according to claim 12, wherein the light control layer includes a photosensitive substance.

16. The reflective screen according to claim 15,
wherein the transmittance of the photosensitive substance changes by the photosensitive substance receiving ultraviolet rays as excitation light, and
wherein a light guiding layer that guides the excitation light to the photosensitive substance is provided.

17. The reflective screen according to claim 16, wherein the light control layer is provided with a blocking layer that blocks at least some of the excitation light and is arranged at positions that sandwich the photosensitive substance and the light guiding layer from both sides.

18. The reflective screen according to claim 1,
wherein the reflective layer is formed in a plurality of island shapes at positions on the unit optical shapes where the image light is incident.

19. The reflective screen according to claim 1, wherein the reflective layer includes at least one dielectric film.

20. The reflective screen according to claim 1, wherein the optical shape layer has a circular Fresnel lens shape in which the plurality of unit optical shapes are arranged in concentric circles.

21. The reflective screen according to claim 20, wherein the center of the circular Fresnel lens shape is provided outside of the reflective screen.

22. The reflective screen according to claim 1, further comprising:
a second optical shape layer that is closer to the rear surface side in a thickness direction of the reflective screen than the reflective layer, that has optical transparency, and which is laminated so as to fill valley portions between the unit optical shapes.

23. The reflective screen according to claim 1, wherein a light diffusion layer comprising diffusion particles that have a function to diffuse light is not provided.

24. The reflective screen according to claim 1,
wherein a plurality of the reflective layer portions are integrally bonded.

25. An image display device, comprising:
the reflective screen according to claim 1; and
an image source that projects the image light onto the reflective screen.

* * * * *